United States Patent
Blaner et al.

[11] Patent Number: 6,029,240
[45] Date of Patent: Feb. 22, 2000

[54] METHOD FOR PROCESSING INSTRUCTIONS FOR PARALLEL EXECUTION INCLUDING STORING INSTRUCTION SEQUENCES ALONG WITH COMPOUNDING INFORMATION IN CACHE

[75] Inventors: Bartholomew Blaner, Newark Valley; Stamatis Vassiliadis, Vestal, both of N.Y.

[73] Assignee: International Business Machines Corporation, Armonk, N.Y.

[21] Appl. No.: 08/453,948

[22] Filed: May 30, 1995

Related U.S. Application Data

[62] Division of application No. 08/126,457, Sep. 24, 1993, Pat. No. 5,465,377, which is a continuation of application No. 07/642,011, Jan. 15, 1991, Pat. No. 5,295,249.

[51] Int. Cl.[7] ............................ G06F 15/16; G06F 13/00; G06F 9/38
[52] U.S. Cl. ............................ 712/23; 712/207; 712/215; 712/213
[58] Field of Search ..................................... 395/800, 425, 395/375, 275, 250, 841, 445, 452; 364/131–134; 712/23, 24, 207, 213, 215, 216; 711/125, 116, 117

[56] References Cited

U.S. PATENT DOCUMENTS

| | | | |
|---|---|---|---|
| 4,437,149 | 3/1984 | Pomerene et al. | 395/375 |
| 4,476,525 | 10/1984 | Ishii | 395/375 |
| 4,928,226 | 5/1990 | Kamada et al. | 395/375 |
| 5,027,270 | 6/1991 | Riordan et al. | 395/425 |
| 5,075,844 | 12/1991 | Jardine et al. | 395/375 |

*Primary Examiner*—Larry D. Donaghue
*Attorney, Agent, or Firm*—Lane, Aitken & McCann; Lynn L. Augspurger

[57] ABSTRACT

A digital computer system capable of processing two or more computer instructions in parallel and having a cache storage unit for temporarily storing machine-level computer instructions in their journey from a higher-level storage unit of the computer system to the functional units which process the instructions. The computer system includes an instruction compounding unit located intermediate to the higher-level storage unit and the cache storage unit for analyzing the instructions and generating for to each instruction a compounding information which indicates whether or not that instruction may be processed in parallel with one or more neighboring instructions in the instruction stream. These tagged instructions are then stored in the cache unit with the compounding information. The computer system further includes a plurality of functional instruction processing units which operate in parallel with one another. The instructions supplied to these functional units are obtained from the cache storage unit. At instruction issue time, the compounding information for the instructions is examined and those instructions indicated for parallel processing are sent to different ones of the functional units in accordance with the codings of their operation code fields.

10 Claims, 16 Drawing Sheets

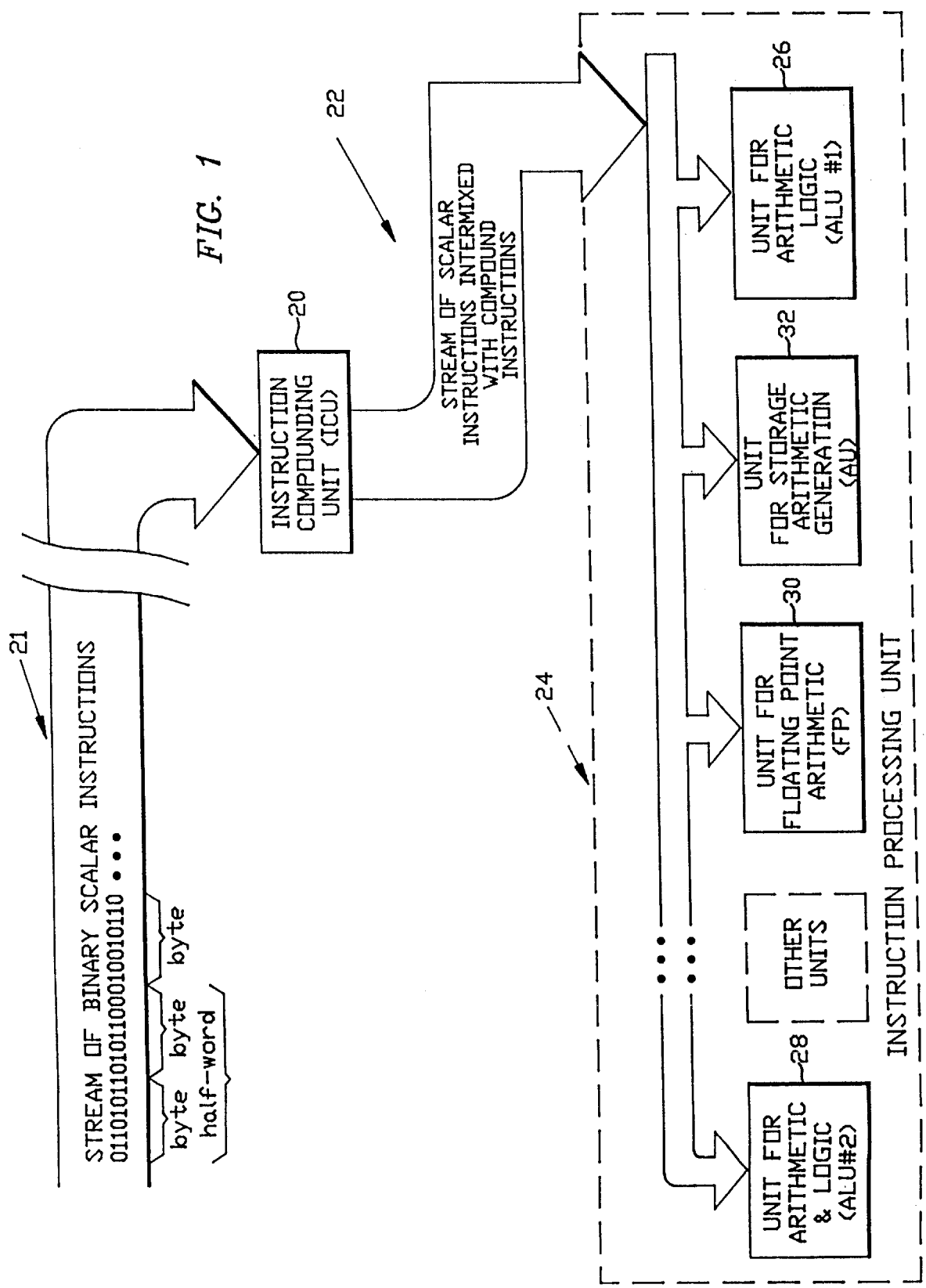

1. RR-format
   - LCR – Load Complement
   - LPR – Load Positive
   - LNR – Load Negative
   - LR – Load
   - LTR – Load and Test
   - NR – AND
   - OR – OR
   - XR – Exclusive OR
   - AR – Add
   - SR – Subtract
   - ALR – Add Logical
   - SLR – Subtract Logical
   - CLR – Compare Logical
   - CR – Compare 2. RS-format shifts
   - SRL – Shift Right Logical
   - SLL – Shift Left Logical
   - SRA – Shift Right Arithmetic
   - SLA – Shift Left Arithmetic 3. Branches – on count and index
   - BCT – Branch on Count (RX)
   - BCTR – Branch on Count (RR)
   - BXH – Branch on Index High (RS)
   - BXLE – Branch on Index Low (RS)

4. Branches – on condition
   - BC – Branch on Condition (RX)
   - BCR – Branch on Condition (RR)

5. Branches – and link
   - BAL – Branch and Link (RX)
   - BALR – Branch and Link (RR)
   - BAS – Branch and Save (RX)
   - BASR – Branch and Save (RR)

6. Stores
   - STCM – Store Characters Under Mask (RS)
   - MVI – Move Immediate (SI)
   - ST – Store (RX)
   - STC – Store Character (RX)
   - STH – Store Half (RX)

7. Loads
   - LH – Load Half (RX)
   - L – Load (RX)
   - IC – Insert Character

8. LA – Load Address (RX)

9. RX/SI/RS-format arithmetics, logicals, inserts
   - A – Add
   - AH – Add Half
   - AL – Add Logical
   - N – AND
   - O – OR
   - S – Subtract
   - SH – Subtract Half
   - SL – Subtract Logical
   - X – Exclusive OR
   - C – Compare
   - CH – Compare Half
   - CL – Compare Logical
   - CLI – Compare Logical Immediate (SI)

10. TM – Test Under Mask (SI)

FIG. 2A

11. FP RR-format adds, subtracts, compares
- ADR – Add normalized long
- AER – Add normalized short
- AWR – Add unnormalized long
- AUR – Add unnormalized short
- CDR – Compare normalized long
- CER – Compare normalized short
- SDR – Subtract normalized long
- SER – Subtract normalized short
- SWR – Subtract unnormalized long
- SUR – Subtract unnormalized short 12. FP RR-format loads
- LDR – Load long
- LER – Load short
- LTDR – Load and Test long
- LTER – Load and Test short
- LCDR – Load Complement long
- LCER – Load Complement short
- LNDR – Load Negative long
- LNER – Load Negative short
- LPDR – Load Positive long
- LPER – Load Positive short 13. FP RR-format multiplies
- MDR – Multiply long
- MXDR – Multiply long to extended
- MER – Multiply short to long 14. FP RX-format adds, subtracts, compares
- AD – Add normalized long
- AE – Add normalized short
- AW – Add unnormalized long
- AU – Add unnormalized short
- CD – Compare normalized long
- CE – Compare normalized short
- SD – Subtract normalized long
- SE – Subtract normalized short
- SW – Subtract unnormalized long
- SU – Subtract unnormalized short 15. FP RX-format multiplies
- MD – Multiply long
- MXD – Multiply long to extended
- ME – Multiply short to long 16. FP RX-format stores
- STD – Store long
- STE – Store short 17. FP RX-format loads
- LD – Load long
- LE – Load short

FIG. 2B

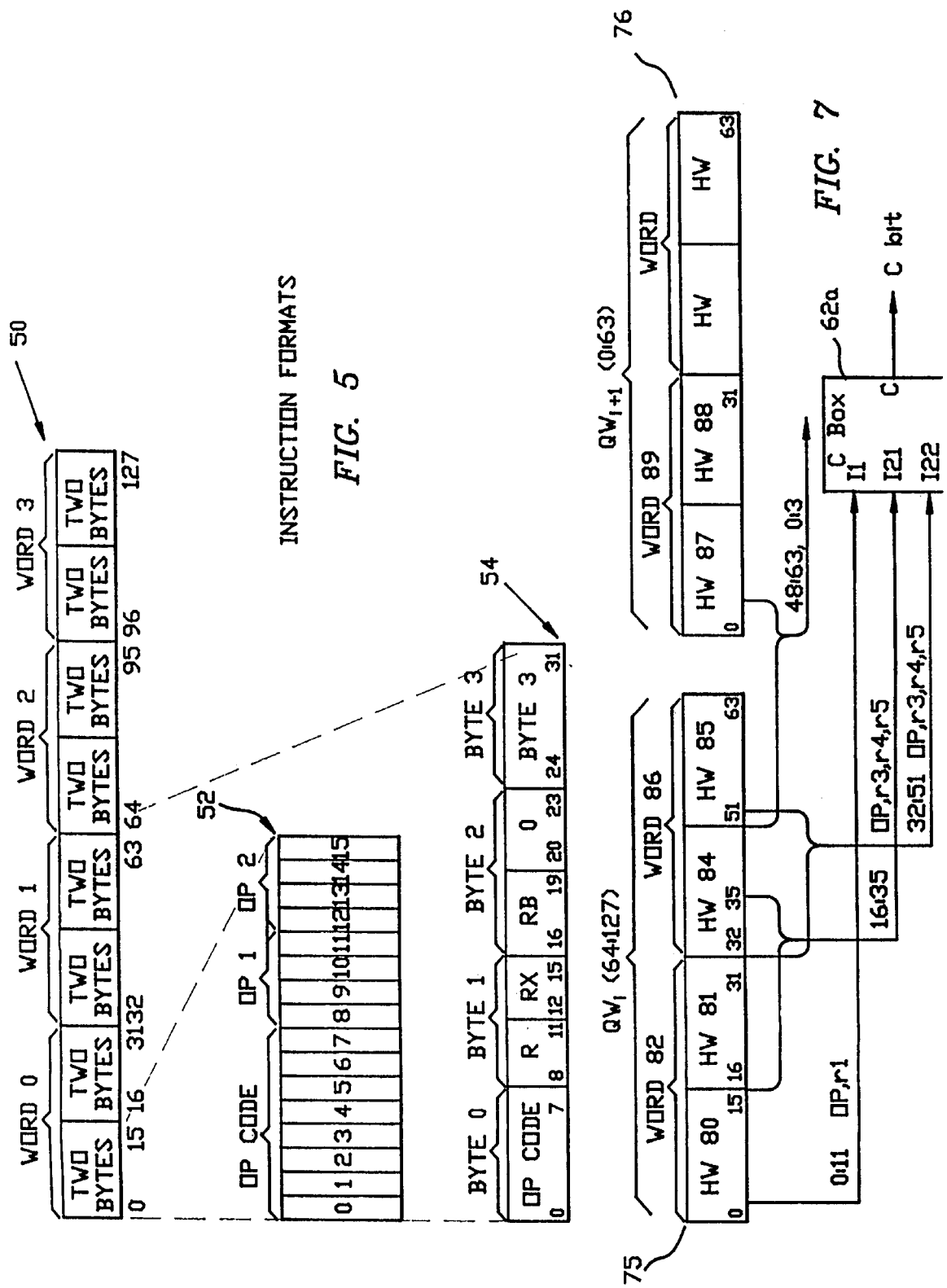

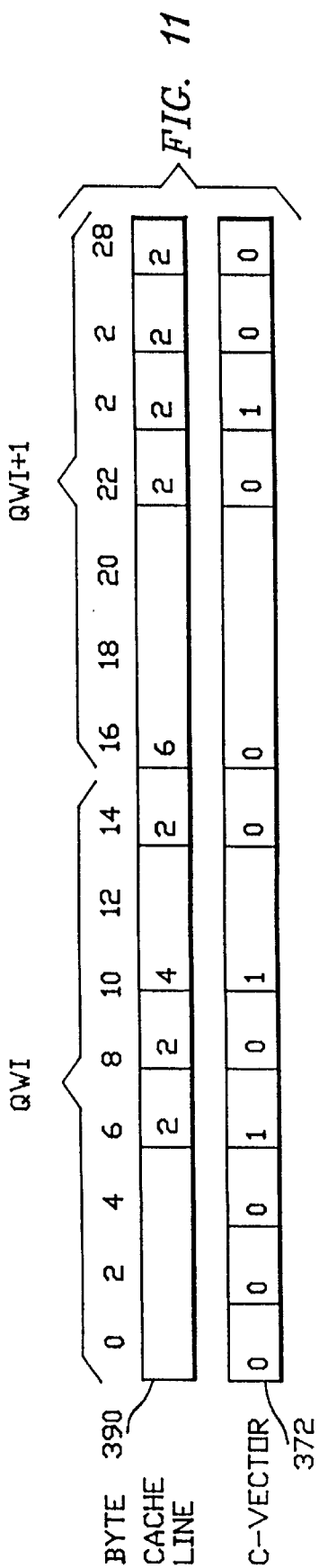
FIG. 11
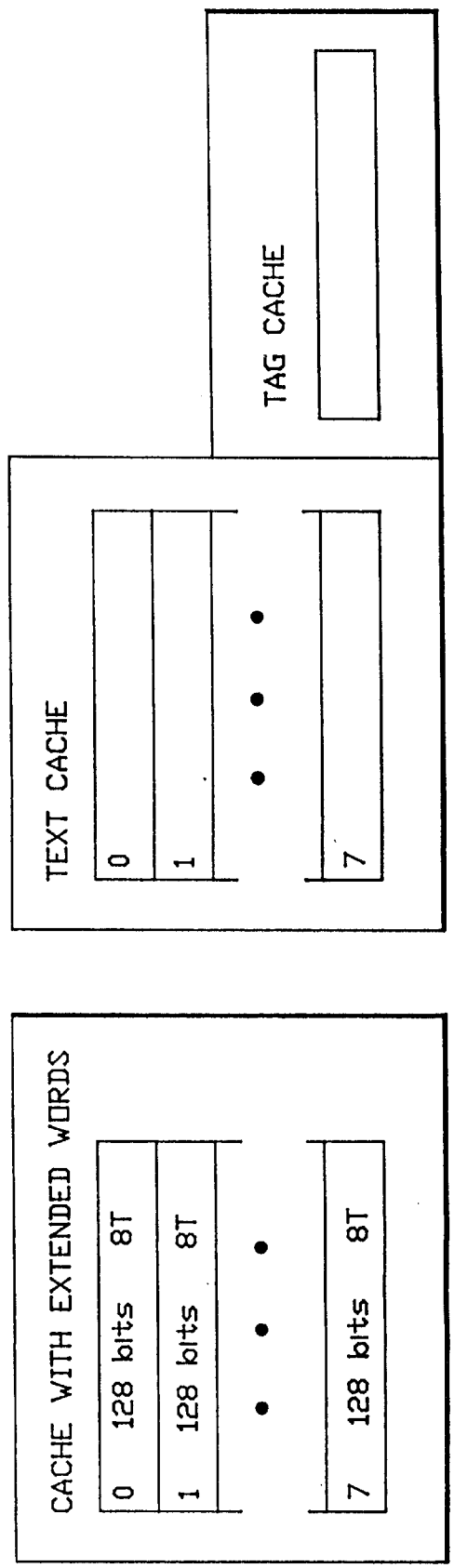
FIG. 12B
FIG. 12A

| NO. | OP CODE | R/M | R/X | B | D | ACTION |
|---|---|---|---|---|---|---|
| I1 | LOAD | R2 | 0 | R7 | 0 | STORAGE → R2 (STORAGE ADDRESS = 0 + R7 + 0) |
| I2 | ADD | R3 | R2 | 0 | 0 | R3 + R2 → R3 |
| I3 | COMPARE | R3 | R4 | 0 | 0 | R3 (C) R4 → CONDITION CODE |
| I4 | BRANCH ON CONDITION | 8 | 0 | 0 | 20 | ADDRESS (0 + R7 +20) TO INSTR. COUNTER IF CONDITION MET (CC=8) |
| I5 | STORE | R3 | 0 | R7 | 0 | R3 → STORAGE (ADR. = 0 + R7 + 0) (IF CONDITION NOT MET) |

METHOD FOR PROCESSING INSTRUCTIONS FOR PARALLEL EXECUTION INCLUDING STORING INSTRUCTION SEQUENCES ALONG WITH COMPOUNDING INFORMATION IN CACHE

This is a division of application Ser. No. 08/126,457 of Bartholomew Blaner et al., filed on Sep. 24, 1993 now U.S. Pat. No. 5,465,377 which is a continuation of Ser. No. 07/642,011, filed on Jan. 15, 1997 now U.S. Pat. No. 5,295,249 for Compounding Preprocessor for Cache.

CROSS REFERENCE TO RELATED APPLICATIONS

The present United States patent application is related to the following co-pending United States patent applications:

(1) Application Ser. No. 07/519,382, filed May 4, 1990, entitled "Scalable Compound Instruction Set Machine Architecture", the inventors being Stamatis Vassiliadis et al, now abandoned;

(2) Application Ser. No. 07/519,384, filed May 4, 1990, entitled "General Purpose Compound Apparatus For Instruction-Level Parallel Processors", the inventors being Richard J. Eickemeyer et al, now abandoned;

(3) Application Ser. No. 07/504,910, filed Apr. 4, 1990, entitled "Data Dependency Collapsing Hardware Apparatus", the inventors being Stamatis Vassiliadis et al, now U.S. Pat. No. 5,051,940;

(4) Application Ser. No. 07/522,291, filed May 10, 1990, entitled "Compounding Preprocessor for Cache", the inventors being Bartholmew Blaner et al, now U.S. Pat. No. 5,214,763;

(5) Application Ser. No. 07/543,464, filed Jun. 26, 1990, entitled "An In-Memory Preprocessor for a Scalable Compound Instruction Set Machine Processor", the inventors being Richard J. Eickemeyer et al, now abandoned;

(6) Application Ser. No. 07/543,458, filed Jun. 26, 1990, entitled "Memory Management for Scalable Compound Instruction Set Machines with In-Memory Compounding", the inventors being Richard J. Eickemeyer et al, now U.S. Pat. No. 5,197,135; and (7) Application Ser. No. 07/619,868, filed Nov. 25, 1990, entitled "Overflow Determination for Three-Operand ALUS in a Scalable Compound Instruction Set Machine", the inventors being Stamatis Vassiliadis et al, now U.S. Pat. No. 5,301,341.

These co-pending applications and the present application are owned by one and the same assignee, namely, International Business Machines Corporation of Armonk, N.Y.

The descriptions set forth in these co-pending applications are hereby incorporated into the present application by this reference thereto.

This application is a continuation-in-part of U.S. patent application Ser. No. 07/519,384, filed May 4, 1990, now abandoned, and U.S. patent application Ser. No. 07/522,291, filed May 10, 1990, now U.S. Pat. No. 5,214,763.

TECHNICAL FIELD

This invention relates to digital computers and digital data processors and particularly to digital computers and data processors capable of processing two or more instructions in parallel.

BACKGROUND OF THE INVENTION

The performance of traditional computers which execute instructions one at a time in a sequential manner has improved significantly in the past largely due to improvements in circuit technology. Such one-at-a-time instruction execution computers are sometimes referred to as "scalar" computers or processors. As the circuit technology is pushed to its limits, computer designers have had to investigate other means to obtain significant performance improvements.

Recently, so-called "super scalar" computers have been proposed which attempt to increase performance by executing more than one instruction at a time from a single instruction stream. Such proposed super scalar machines typically decide at instruction execution time if a given number of instructions may be executed in parallel. Such decision is based on the operation codes (op codes) of the instructions and on data dependencies which may exist between adjacent instructions. The op codes determine the particular hardware components each of the instructions will utilize and, in general, it is not possible for two or more instructions to utilize the same hardware component at the same time nor to execute an instruction that depends on the results of a previous instruction (a data dependency). These hardware and data dependencies prevent the execution of some instruction combinations in parallel. In this case, instructions are instead executed by themselves in a non-parallel manner. This, of course, reduces the performance of a super scalar machine.

Proposed super scalar computers provide some improvement in performance but also have disadvantages which it would be desirable to minimize. For one thing, deciding at instruction execution time which instructions can be executed in parallel takes significant amount of time which cannot be very readily masked by overlapping it with other normal machine operations. This disadvantage becomes more pronounced as the complexity of the instruction set architecture increases. Another disadvantage is that the decision making must be repeated all over again each time the same instructions are to be executed a second or further time.

SUMMARY OF INVENTION

As discussed in co-pending application Ser. No. 07/519,382 (IBM Docket EN9-90-020), one of the attributes of a Scalable Compound Instruction Set Machine (SCISM) is performance of the parallel execution decision prior to execution time. In SCISM architecture, the decision to execute in parallel is made at an earlier point in the overall instruction handling process. For example, the decision can be made ahead of the instruction buffer in those machines which have instruction buffers or instruction stacks. For another example, the decision can be made ahead of the instruction cache in those machines which flow the instructions through a cache unit.

Another attribute of a SCISM machine is to record the results of the parallel execution decision making so that such results are available in the event that those same instructions are used a second or further time.

In one embodiment of the present invention, the recording of the parallel execution decision making is accomplished by generating information in the form of tags which accompany the individual instructions in an instruction stream. These tags tell whether the instructions can be executed in parallel or whether they need to be executed one at a time. This instruction tagging process is sometimes referred to herein as "compounding". It serves, in effect, to combine at least two individual instructions into a single compound instruction for parallel processing purposes.

In a particularly advantageous embodiment of the present invention, the computer is one which includes a cache storage mechanism for temporarily storing machine instructions in their journey from a higher-level storage unit of the computer to the instruction execution units of the computer. The compounding process is performed intermediate to the higher-level storage unit and the cache storage mechanism so that there is stored in the cache storage mechanism both instructions and compounding information. As is known, the use of a well-designed cache storage mechanism, in and of itself, serves to improve the overall performance of a computer. Further, the storing of the compounding information into the cache storage mechanism enables the information to be used over and over again so long as the instructions in question remain in the cache storage mechanism. As is known, instructions frequently remain in a cache long enough to be used more than once.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 illustrates the location of the invention in a stream of scalar instructions.

FIGS. 2A and 2B illustrate categorization of instructions in an exemplary instruction set.

FIG. 5 illustrates the formats of instructions which are analyzed for parallel execution according to the invention.

FIG. 7 is a partial block diagram illustrating how the instruction compounding unit of FIG. 6 analyzes two instructions.

FIG. 11 is a representation of a block of instructions analyzed by the instruction compounding unit of FIG. 6 together with an information vector indicating the results of the analysis.

FIGS. 12A and 12B are schematic diagrams illustrating cache storage of instruction blocks and accompanying compounding information.

DETAILED DESCRIPTION OF THE PREFERRED EMBODIMENT

Instruction Compounding

Figure 3:
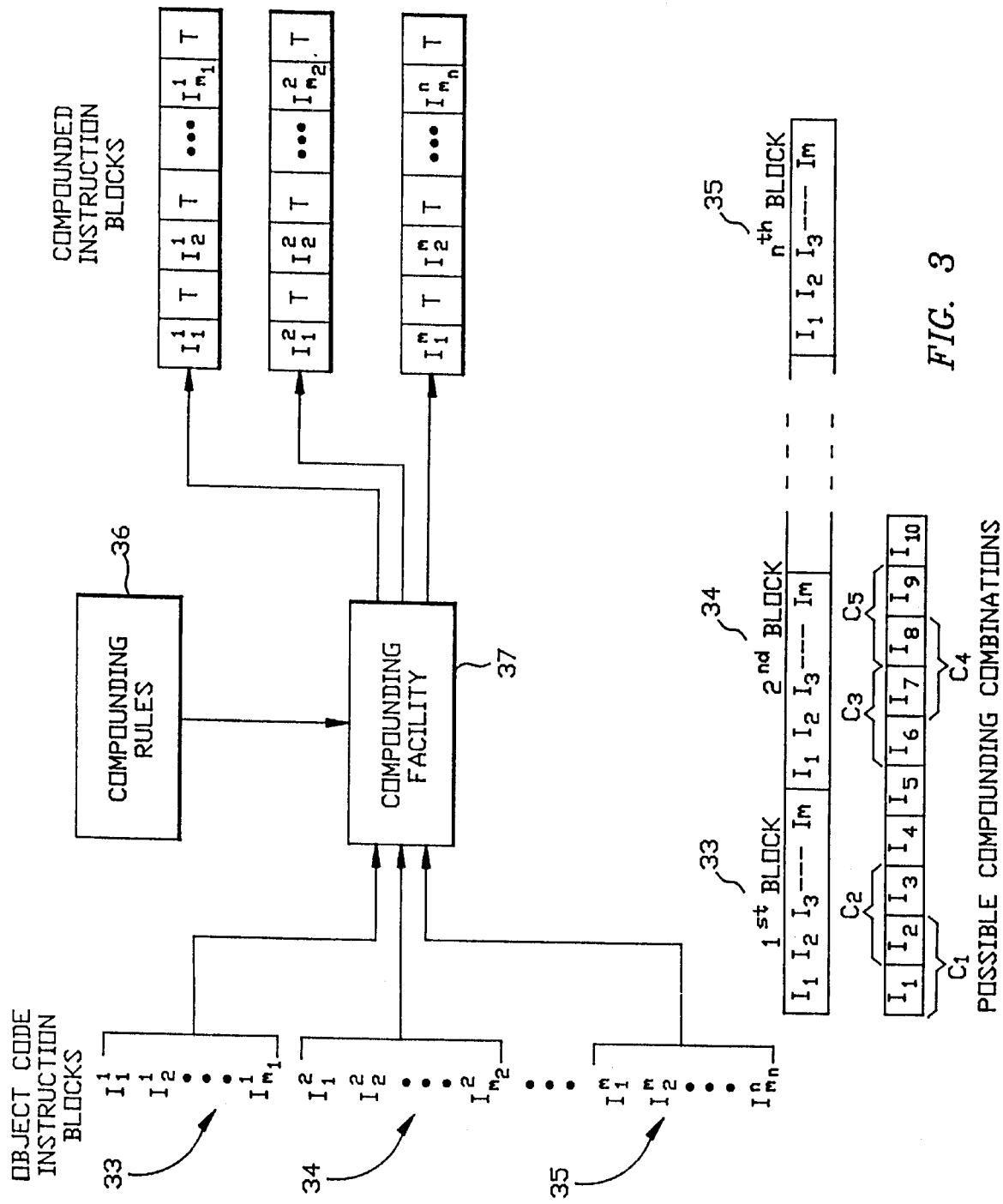
FIG. 3 illustrates how an instruction stream is analyzed according to a set of rules establishing which instructions of which categories can be executed in parallel with instructions of other categories.

Referring to FIG. 1 of the drawings, there is shown a representative embodiment of a portion of a digital computer system or a digital data processing system constructed in accordance with the present invention. The illustrated computer system is capable of executing two or more instructions in parallel. The system includes the capability of compounding instructions for parallel execution. In this regard, the compounding process refers to the grouping of a plurality of instructions in a scalar instruction sequence for parallel execution, wherein the size of the grouping is scalable from 1 to N. Preferably, the sequence of scalar instructions are drawn from an existing set of scalar instructions such as that used in the IBM System/370 products. The compounding process described herein leaves the object code of compounded instructions unaltered, thereby maintaining compatability with previously-implemented computer systems.

In order to support the parallel execution of a group of up to N instructions, the computer system includes a plurality of instruction execution units which operate in parallel and in a concurrent manner.

As is generally shown in FIG. 1, an instruction compounding unit 20 takes a stream of binary scalar instructions 21 and selectively groups some of the adjacent scalar instructions (which would otherwise be executed singly) for parallel execution. A resulting compounded instruction stream 22 therefore provides scalar instructions to be executed singly or in compound instructions formed by groups of scalar instructions to be executed in parallel. When a scalar instruction is presented to an instruction processing unit 24, it is routed to the appropriate one of a plurality of execution units for serial execution. When compounded instructions are presented to the instruction processing unit 24, each of the scalar components is routed to an appropriate execution unit for simultaneous parallel execution with the others. Typical execution units include, but are not limited to, an arithmetic logic unit (ALU) 26 for executing an instruction in response to two operands, a floating point arithmetic unit (FP) 30, a storage address generation unit (AU) 32, and a data-dependency collapsing ALU 28. An exemplary data-dependency collapsing unit is disclosed in co-pending application Ser. No. 07/504,910.

The compounding procedure upon which this invention depends can be implemented in a uniprocessor environment having a plurality of execution units where each execution unit executes a scalar instruction or alternatively a compounded scalar instruction. Further, compounded instructions can be executed in parallel in certain other computer system configurations. For example, compounding can be exploited in a multi-processor environment where a compound instruction is treated as a single unit for execution by one of a plurality of CPU's (central processing units).

Preferably, a computer architecture which can be adapted for handling compounded instructions is an IBM System/370 instruction-level architecture in which multiple scalar instructions can be issued for execution in each machine cycle. In this context, in the System/370 pipelined computer architecture, a machine cycle encompasses all of the pipeline steps or stages required to execute a scalar instruction.

The instruction sets for various IBM System/370 architectures such as the System/370, the System/370 extended architecture (370-XA), and the System/370 Enterprise Systems Architecture (370-ESA) are well known. Respecting these architectures, reference is given here to the *Principles of Operation* of the IBM System/370 (Publication #GA22-7000-10, 1987), and to the *Principles of Operation,* of the IBM Enterprise Systems Architecture/370 (Publication #SA22-7200-0, 1988). Also helpful is the publication entitled *IBM 370 Assembly Language with ASSIST Structured Concepts in Advanced Topics,* by C. J. Kacmar, Prentice Hall, 1988.

In general, an instruction compounding facility will look for classes of instructions that may be executed in parallel, and will ensure that no interlocks between members of a compound instruction exist that cannot be handled by the hardware. When compatible sequences of instructions are found, the instructions are compounded.

Relatedly, an interlock occurs in parallel execution when concurrently-executing instructions require access to the same execution resource and no hardware means is provided for affording the concurrent access. If access is required to obtain operand data from the resource, a data-dependency interlock exists if the data must be written by one instruction before being either read or written by the other instruction. An address generation interlock exists if data being produced by execution of one of the instructions is required by a simultaneously-executing instruction for address calculation.

In order to identify instructions of a known instruction set which are compatible with other instructions for simultaneous execution, the set from which the instructions are drawn can be broken into categories of instructions that may be executed in parallel in a computer system configuration which executes all instructions of the instruction set. Instructions within certain of these categories may be compounded with instructions in the same category or with instructions in certain other categories. For example, the System/370 instruction set can be partitioned into the categories illustrated in FIG. 2. The rationale for this categorization is based on the functional requirements of the System/370 instructions and their hardware utilization in a typical System/370 computer system configuration. Other instructions of the System/370 instruction set are not considered specifically for compounding in this exemplary embodiment. This does not preclude them from being compounded by the technique of the present invention.

For example, consider the instructions contained in category 1 compounded with instructions from that same category in the following instruction sequence:

AR R1, R2
SR R3, R4

This sequence is free of data dependence interlocks and produces the following results which comprise two independent System/370 instructions:

R1=R1+R2
R3=R3−R4

Executing such a sequence would require two independent and parallel two-to-one ALU's designed to the instruction level architecture. Thus, it will be understood that these two instructions can be grouped to form a compound instruction in a computer system configuration which has two such ALU's. This example of compounding scalar instructions can be generalized to all instruction sequence pairs that are free of data dependence interlocks, hardware dependence interlocks, and address generation interlocks.

The flow diagram in FIG. 3 shows the generation of a compound instruction set program from an object code program in accordance with a set of customized compounding rules which reflect the categories of FIG. 2 together with both the system and hardware architecture of a System/370 complex. Successive blocks of object code instructions are provided as a byte stream which is input to a compounding facility that produces compounded instructions. Successive blocks of instructions in the byte stream having predetermined lengths are analyzed by the compounding facility 37. The length of each block 33, 34, 35 in the byte stream which contains the group of instructions considered together for compounding is dependent on the complexity of the compounding facility.

The particular compounding facility illustrated in FIG. 3 is designed to consider two-way compounding for "m" instructions in each block. The compounding facility 25 employs a two-instruction-wide window to consider every pair of instructions in each block.

In this exemplary two-way compounding scheme, compounding information is added to the instruction stream as one bit for every two bytes of text. In general, a tag containing control information can be produced for each instruction in the compounded byte stream—that is for each non-compounded scalar instruction as well as for each compounded scalar instruction included in a pair, triplet, or larger compounded group. This general approach is employed in the example of this invention. Relatedly, the tags specifically identify and differentiate those compounded scalar instructions forming a compounded group from the remaining non-compounded scalar instructions of a block. The non-compounded scalar instructions remain in the block, and when fetched are executed alone.

The case of compounding at most two instructions provides the smallest grouping of scalar instructions to form a compound instruction, and uses the following preferred encoding procedure for the compounding information. Since all System/370 instructions are aligned on a half word (two-byte) boundary with lengths of either two, four, or six bytes, only one bit of compounding information need be provided for every half word. Hereinafter, the bits which contain the compounding information are called "tag bits" or "C bits". In this example, the tag bit value "one" indicates that the instruction that begins in the byte under consideration is compounded with the following instruction, while a tag bit value of "zero" indicates that the instruction that begins in the byte under consideration is not compounded with the following instruction. The tag bits associated with half words not containing the first byte of an instruction are ignored. When a compounded pair is fetched for execution, the tag bit for the first byte of the second instruction of a compounded pair is also ignored. As a result, this encoding procedure requires only one bit of information to identify a compounded instruction to a CPU during execution of the instruction.

As will be appreciated, when more than two scalar instructions can be grouped together to form a compound instruction, additional tag bits may be required. The minimum number of tag bits needed to indicate the specific number of scalar instructions actually compounded is the logarithm to the base two (rounded up to the nearest whole number) of the maximum number of scalar instructions that can be grouped to form a compound instruction. For example, if the maximum is two, then one tag bit is needed for each compound instruction. If the maximum is three or four, then two tag bits are needed for each compound instruction, and so on.

It will be apparent to those skilled in the art that the present invention requires an instruction stream to be compounded only once for a particular computer system configuration, and thereafter any fetch of compounded instructions will also cause a fetch of the tag bits associated therewith. This avoids the need for the inefficient last-minute determination in selection of certain scalar instructions for parallel execution that repeatedly occurs every time the same or different instructions are fetched for execution in the so-called super scalar machine.

Despite the advantage of compounding an object code instruction stream, it becomes a difficult procedure to implement under certain computer architectures unless a technique is developed for determining instruction boundaries in a byte stream. Such a determination is complicated when variable length instructions are allowed, and is further complicated when data and instructions can be intermixed in the same byte stream. Of course, at execution time instruction boundaries must be known to allow proper execution. But since compounding is preferably done a sufficient time prior to instruction execution, a technique is needed to compound instructions without knowledge of where instructions start and without knowledge of which bytes are data. In the example of this invention, the worst case is assumed, that is that instruction lengths are variable, that data is intermixed with instructions in the byte stream being compounded, and no reference points are available in the byte stream to identify instructions. As will be appreciated, for compounding, the absence of a reference point to identify the beginning of an instruction creates uncertainty in that many more tag bits will be generated by the compounding unit than might otherwise be necessary. Nevertheless, the unique technique of this invention works equally well with either fixed or variable length instructions. Once the start of an instruction is known (or presumed), the length can always be found in one way or another somewhere in the instructions. In the System/370 instructions, the length is encoded in the first two bits of the op code. In other systems, the length may be encoded in the operands or implicit if all instructions are the same length.

Operational Environment

Figure 4:
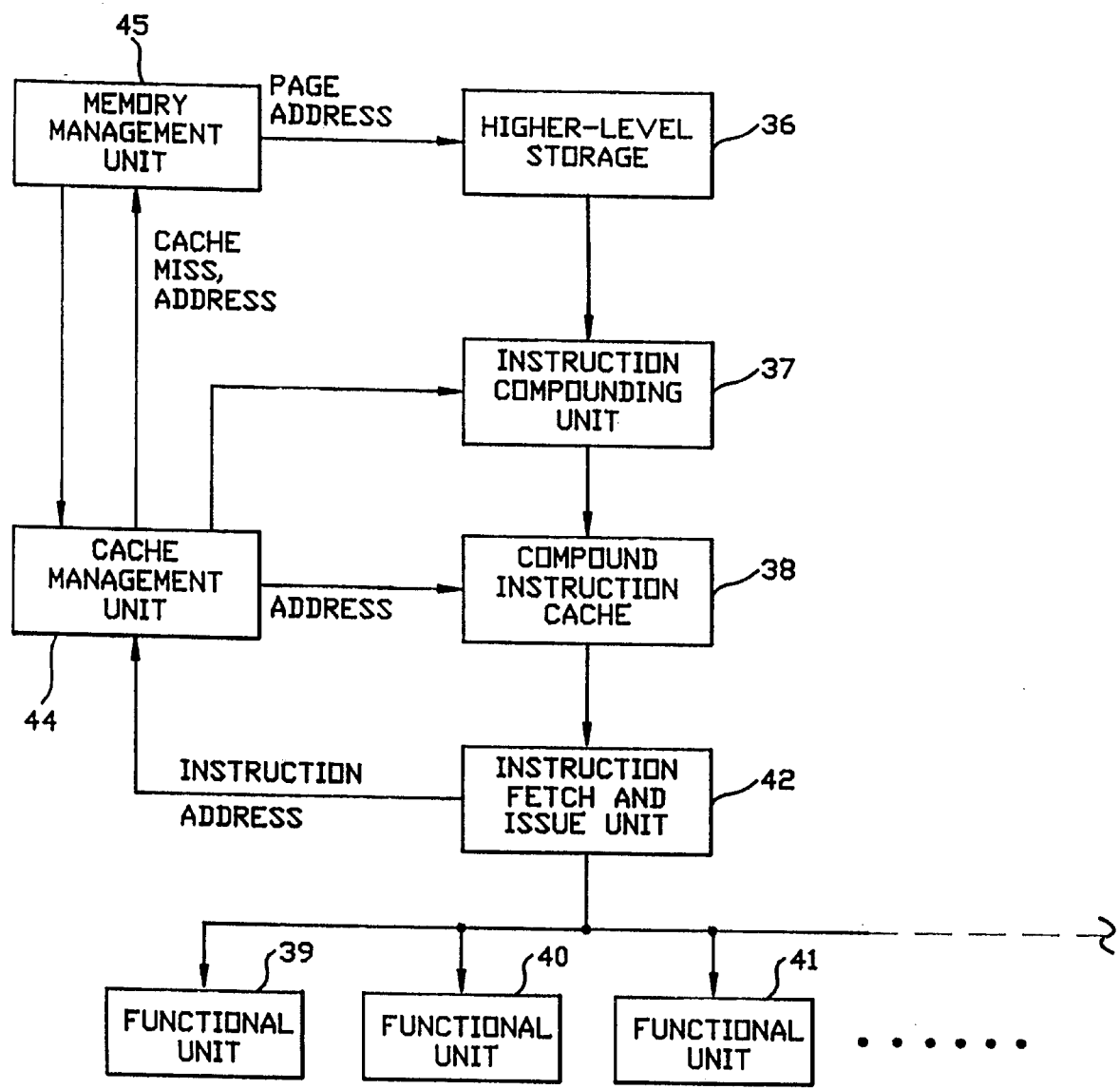
FIG. 4 illustrates the operational environment of the invention and the invention's location in the environment.

Referring to FIG. 4 of the drawings, there is shown a representative embodiment of a portion of a digital computer system or digital data processing system constructed in accordance with the present invention. This computer system is capable of processing two or more instructions in parallel. It includes a first storage mechanism for storing instructions and data to be processed. This storage mechanism is identified as higher-level storage 36. This storage 36 (also "main memory") is a larger-capacity, lower-speed storage mechanism and may be, for example, a large-capacity system storage unit or the lower portion of a comprehensive hierarchical storage system or the like.

The computer system of FIG. 4 also includes an instruction compounding mechanism for receiving instructions from the higher-level storage 36 and associating with these instructions compounding information in the form of tags which indicate which of these instructions may be processed in parallel with one another. This instruction compounding mechanism is represented by instruction compounding unit 37. This instruction compounding unit 37 analyzes the incoming instructions for determining which ones may be processed in parallel. Furthermore, instruction compounding unit 37 produces for these analyzed instructions tag bits which indicate which instructions may be processed in parallel with one another and which ones may not be processed in parallel with one another.

The FIG. 4 system further includes a second storage mechanism coupled to the instruction compounding mechanism 37 for receiving and storing the analyzed instructions and their associated tag fields. This second or further storage mechanism is represented by compound instruction cache 38. The cache 38 is a smaller-capacity, higher-speed storage mechanism of the kind commonly used for improving the performance rate of a computer system by reducing the frequency of having to access the lower-speed storage mechanism 36.

The FIG. 4 system further includes a plurality of functional instruction processing units which operate in parallel with one another. These functional instruction processing units are represented by functional units 39, 40, 41, et cetera. These functional units 39–41 operate in parallel with one another in a concurrent manner and each, on its own, is capable of processing one or more types of machine-level instructions. Examples of functional units which may be used are: a general purpose arithmetic and logic unit (ALU), an address generation type ALU, a data dependency collapsing ALU (per co-pending application Ser. No. 071/504, 910 (IBM Docket EN9-90-014), a branch instruction processing unit, a data shifter unit, a floating-point processing unit, and so forth. A given computer system may include two or more of some of these types of functional units. For example, a given computer system may include two or more general purpose ALU's. Also, no given computer system need include each and every one of these different types of functional units. The particular configuration of functional units will depend on the nature of the particular computer system being considered.

The computer system of FIG. 4 also includes an instruction fetch and issue mechanism coupled to compound instruction cache 38 for supplying adjacent instructions stored therein to different ones of the functional instruction processing units 39–41 when the instruction tag bits indicate that they may be processed in parallel. This mechanism also provides single instructions to individual functional units when their tag bits indicate parallel execution is not possible. This mechanism is represented by instruction fetch and issue unit 42. Fetch and issue unit 42 fetches instructions from cache 38, examines the tag bits and instruction operation code (op code) fields and, based upon such examinations, sends the instructions to the appropriate ones of the functional units 38–41.

A stream of instructions is brought in from auxiliary storage devices by known means, and stored in blocks called "pages" in the main memory 36. Sets of continuous instructions called "lines" are moved from the main memory 36 to the compound instruction cache 38 where they are available for high-speed reference for processing by the instruction fetch and issue unit 42. Instructions which are fetched from a cache are issued, decoded at 42, and dispatched to the functional units 39–41 for execution.

During execution, when reference is made to an instruction which is in the program, the instruction's address is provided to a cache management unit 44 which uses the address to fetch one or more instructions, including the addressed instruction, from the instruction cache 38 into a queue in the unit 42. If the addressed instruction is in the cache, a cache "hit" occurs. Otherwise, a cache "miss" occurs. A cache miss will cause the cache management unit 44 to send the line address of the requested instruction to a group of storage management functions illustrated collectively as a memory management unit 45. These functions use the line address provided by the cache management unit 44 to send a line of instructions ("cache line") to the compound instruction cache 38.

In the context of SCISM architecture, in-cache instruction compounding is provided by the instruction compounding unit 37 so that compounding of each cache line can take place at the input to the compound instruction cache 38. Thus, as each cache line is fetched from the main memory 36 into the cache 38, the line is analyzed for compounding in the unit 37 and passed, with compounding information, for storage in the compound instruction cache 38.

Prior to caching, a line is compounded in the instruction compounding unit 37 which generates a set of tag bits. These tag bits may be appended directly to the instructions with which they are associated, or may be provided in parallel with the instructions. In any case, the bits are provided for storage together with their line of instructions in the cache 38. As needed, the compounded instructions in the cache 38 are fetched together with their tag bits by the instruction fetch and issue unit 42. As the instructions are received by the fetch and issue unit 42, their tag bits are examined to determine if they may be processed in parallel and their operation code (op code) fields are examined to determine which of the available functional units is most appropriate for their processing. If the tag bits indicate that two or more of the instructions are suitable for processing in parallel, then they are sent to the appropriate ones in the functional units in accordance with the codings of their op code fields. Such instructions are then processed concurrently with one another by their respective functional units.

When an instruction is encountered that is not suitable for parallel processing, it is sent to the appropriate functional unit as determined by an op code and it is thereupon processed alone and by itself in the selected functional unit.

In the most perfect case, where plural instructions are always being processed in parallel, the instruction execution rate of the computer system would be N times as great as for the case where instructions are executed one at a time, with N being the number of instructions in the groups which are being processed in parallel.

Instruction Formats

In FIG. 5, there is illustrated a quadword 50 which forms a portion of a cache line, the remainder of which is not illustrated. The quadword 50 includes four words, denoted as WORD0–WORD3. Each word includes a pair of half words, each half word including two bytes of data. Each byte includes 16 bits. Bit positions are numbered in ascending order for the quadword from bit 0 through bit 127.

Assume that the first half word in WORD0 includes a conventional two-byte instruction such as would be found in the instruction set for the System/370. The half word instruction 52 includes 16 bits of which the first eight, bits 0–7, form the op code. In the op code, bits 0 and 1 provide the length field code. In System/370 instructions, a code value of 0 indicates that the instruction is one half word long, the codes 01 and 10 denote a double half word (four byte) instruction, and the code 11 denotes that the instruction includes three half words (six bytes). The two byte instruction format includes a designation of a first operand in bit positions 8–11 and the second operand in bit positions 12–15. These operand fields identify registers of a set of general purpose registers where the operands for the instruction are stored.

Reference numeral 54 in FIG. 5 indicates the format for a double half word (four byte) instruction. In the double half word instruction, the first eight bits (byte 0) contain an op code with a length field code of 01 or 10. The first four bits of the second byte of the double word (byte 1) identify the first operand for the instruction in the form of a register (R) in the general purpose registers. The second four bits of byte 1 in the double half word instruction identify an address index register (RX) in the general purpose registers, while the first four bits of byte 2 identify a base address register (RB). As is known, the RX and RB registers are used for operand address calculation.

Instruction Compounding Unit

Figure 6A:
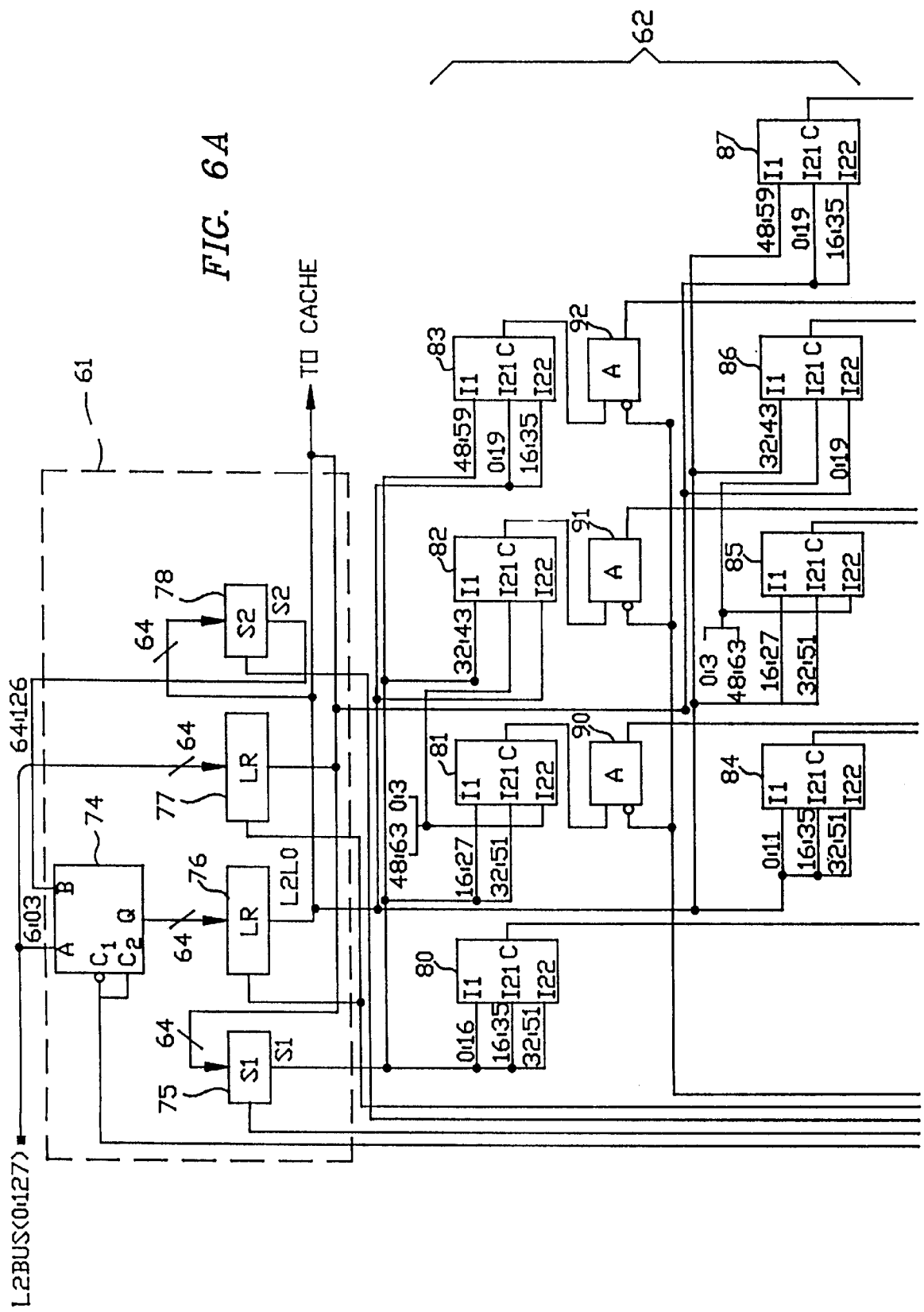
FIGS. 6A and 6B form a block diagram illustrating a compounding unit according to the invention which analyzes instructions for parallel execution according to a set of rules and generates information indicating the outcome of the analysis.
Figure 6B:
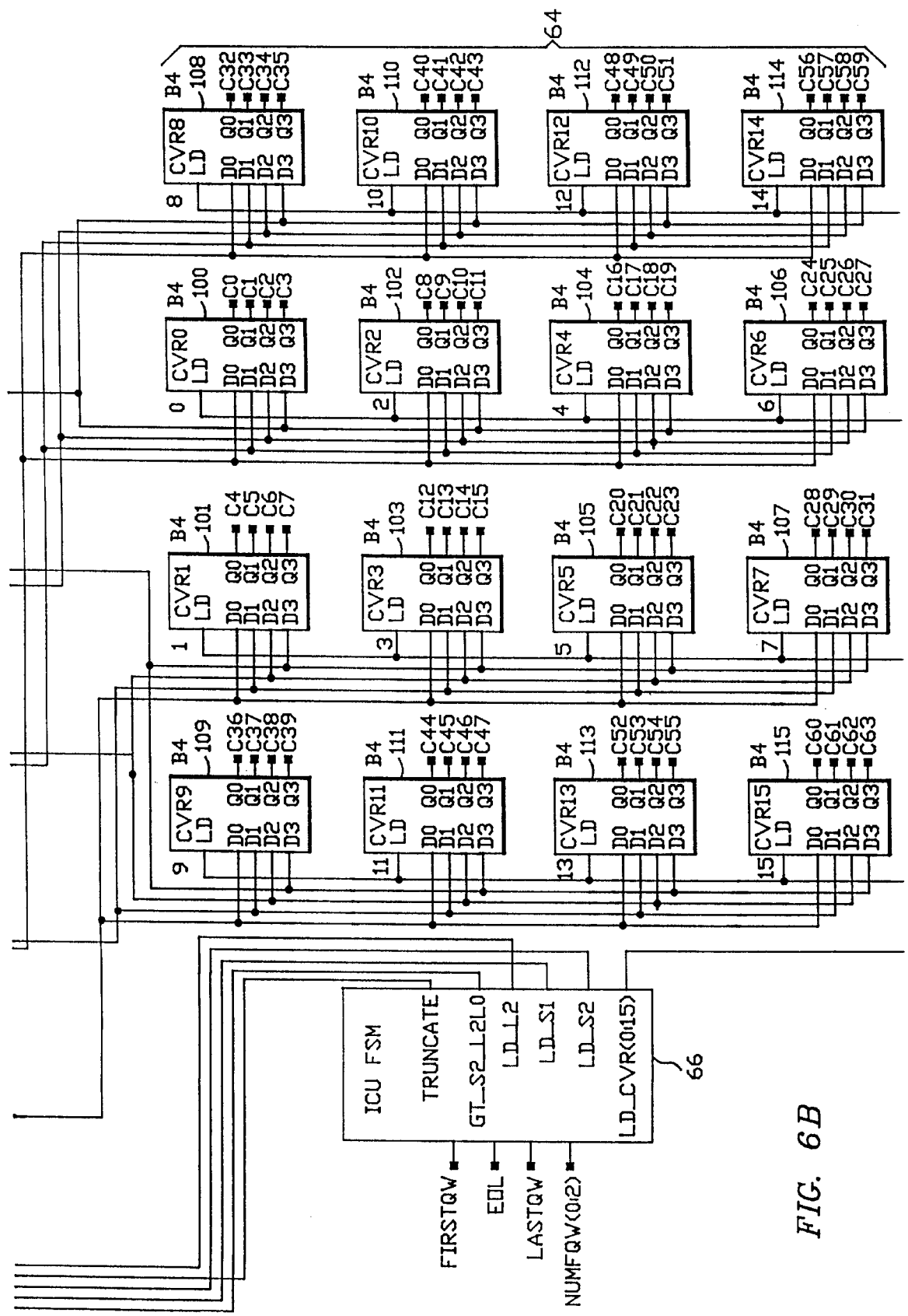

For the purpose of understanding the description of the instruction compounding unit which follows, instructions are provided in a cache line comprising a block of eight quad words, designated QW0–QW7. The instruction compounding unit, shown in greater detail in FIGS. 6A and 6B (hereinafter "FIG. 6"), is suitable for use as the instruction compounding unit 37 of FIG. 1 to compound a cache line. The instruction compounding unit of FIG. 6 is designed for the general case in which instructions may be two, four, or six bytes in length, data may be interspersed in the cache line, and no reference point is provided to indicate where the first instruction begins. The instruction compounding unit of FIG. 6 simultaneously compounds a maximum of eight instructions, two instructions at a time, for parallel execution. In this case, a one-bit compounding signal is generated, with a compounding bit being generated for each half word of the line. Consequently, sixty four compounding bits (C bits) will be generated for each cache line.

To understand the operation of the instruction compounding unit of FIG. 6, consider the compounding rules which it implements. If d is a dependency function over two instructions, $i_j$ and $i_k$, where j and k represent an instruction category number, $i_j$ will be referred to as the first or left instruction, while $i_k$ will be referred to as the second or right instruction. The dependency function d maps the dependencies between the two instructions being compounded into a set [A, E, ø] where A is an address generation dependency, E is an execution unit (data) dependency, and ø represents no dependencies, that is, independent execution.

Consider a compounding function C over two instructions being compounded. Given a value for d for these two instructions, together with a hardware requirement for each instruction, C is a binary function defined simply as C=1 meaning that the instructions can be compounded, or C=0, meaning that the instructions cannot be compounded.

Consider, for example, the following code sequence:

(1) AR 2,3
(2) SR 4,2
(3) AR 2,3
(4) SR 4,5
(5) SRL 6,1(0)
(6) AR 6,5
(7) AR 2,6
(8) L 1,0(0,2)

Instructions (1) and (2) may be compounded using two execution units (EU2 and EU3) to calculate R2=R2+R3 and R4=R4−(R2+R3). In this regard, EU2 is an execution unit which collapses the interlock between the instructions by performing a 3-to-1 compound operation. Such an execution unit is taught in co-pending patent application Ser. No. 07/504,910. Over instructions (1) and (2), C=1 and d=E.

Instructions (3) and (4) may be compounded using EU2 and EU3 to calculate R2=R2+R3 and R4=R4−R5. No dependency exists between the instructions, therefore C=1 and d=ø.

For instructions (5) and (6), d=E, but C=0 because the interlock cannot be collapsed as the execution unit hardware of instruction (6) is defined. Instructions (7) and (8) demonstrate an address generation dependency: according to the compounding rules implemented by the instruction compounding unit of FIG. 6, C=0 because d=A.

The following symbology is used for considering two potentially compoundable instructions:

op1 r1,r2 ;first or left instruction op2 r3,r4,(r5) ;second or right instruction In this symbology, the designation op refers to the op code found in the first byte of each instruction, while the designations r1, r2 are registers in the register fields of the first instruction and r3, r4, (and possibly r5) are the registers in the fields of the second (and possibly third) byte of a second instruction.

Now, considering the symbology described above, if r4 is used as an addressing operand, as for example in the BCTR and BCR instructions of the System/370 instruction set, r1=r4 is considered an address generation dependency. The designations op1 and op2 are generic in that they may refer to an instruction of any format. The r fields are generally applied to two or four-byte instructions of well-known formats.

Compounding Rules

The rules for compounding category 1 instructions in an exemplary instruction set such as the System/370 instruction set are given below. These rules are implemented in the compounding unit of FIG. 6 and permit the compounding of fixed-point with fixed-point instructions and fixed-point with floating-point instructions. The categories are those designated in FIG. 2.

Category 1 Rules:

1. Categories 1 and 1 C=1 Exceptions C=0 for the following:
    1. op1=any, op2=any, and r1=r3=r4
    2. op1={AR, SR, ALR, SLR}, op2={LPR, LNR}, and r1=r4
2. Categories 1 and 2 C=1 if d=ø; C=0 otherwise
3. Categories 1 and 3
    1. If op 2={BCT,BCTR}, then C=1 if d={(E,ø}; C=0 otherwise
    2. If op2={BXH,BXLE}, then C=1 if d=ø
4. Categories 1 and 4 C=0
5. Categories 1 and 5 C=0 Exceptions
    1. If op1=any and op2={BASR} then c=1 if d={E,ø} ø; C=0 otherwise
    2. If op1=any and op2={BAS} then C=0 if d={A} C=1 otherwise
6. Categories 1 and 6 C=1 if d=ø; C=0 otherwise
7. Categories 1 and 7 C=0 if d=A; C=1 otherwise
8. Categories 1 and 8 C=0 if d=A; C=1 otherwise
9. Categories 1 and 9 C=0 if d=A; C=1 otherwise
10. Categories 1 and 10 C=0 if d=A; C=1 otherwise
11. Categories 1 and 11 C=1
12. Categories 1 and 12 C=1
13. Categories 1 and 13 C=1
14. Categories 1 and 14 C=0 if d=A; C=1 otherwise
15. Categories 1 and 15 C=0 if d=A; C=1 otherwise
16. Categories 1 and 16 C=0 if d=A; C=1 otherwise
17. Categories 1 and 17 C=0 if d=A; C=1 otherwise The rules given above are complete for compounding an instruction pair in which the first instruction of the pair is a category 1 instruction. An exhaustive set of rules would include all categories, and would be constructed according to the compatibility and interlock analysis discussed above.

An instruction compounding unit such as that illustrated in FIG. 6 would implement a complete set of compounding rules for the general case. For purposes of illustration, the operation of the instruction compounding unit of FIG. 6 is presented in the context of two-instruction compounding employing the exemplary rules for category 1 compounding given above.

Detailed Description of the Instruction Compounding Unit

The instruction compounding unit of FIG. 6 includes a sixteen-byte bus 60 corresponding to the storage bus in FIG. 4, which transfers a cache line, quadword-by-quadword, from the main memory 36 to the instruction cache 38. Each quadword on the bus 60 is latched in a staging unit 61. When latching the current quadword on the bus 60, the staging unit 61 also retains the two most significant words of the prior quadword and the two most significant words of the first quadword. Compounding analysis, including instruction categorization, data dependency determination, and address generation dependency determination, is performed in a rules base unit 62 which applies the compounding rules given above. The rules base unit 62 generates a C bit for each of eight half words of a quadword currently in the staging unit 61. A compounding tag register 64 includes 16 individual four-bit registers for storage of the 64 C bits produced for the eight quadwords in a cache line being transferred to the compound instruction cache. The latched C bits can be obtained in parallel from the compounding register 64 to form a compounding bit vector, a C vector, for the cache line being transferred. An instruction compounding unit finite state machine (ICU FSM) 66 generates control signals for synchronization of the operations of the instruction compounding unit of FIG. 6.

In FIG. 6, the staging unit includes four registers 75, 76, 77, and 78. Each of the registers is capable of storing one half of a quadword, that is a double word of 64 bits. A multiplexer 74 fills the register 76 either from the bus 60, or from the output of the register 78. The registers 76 and 77 are designated as the L2LO and L2HI registers, respectively, while the registers 75 and 78 are denoted as S1 and S2 registers. Preferably, quadwords are forwarded to the cache from the registers 76 and 77.

Each quadword on the bus 60 is loaded into the registers 76 and 77, with the double word in bits 0–63 entered into the L2LO register and bits 64–127 into the L2HI register. Following loading of the first quadword into the registers 76 and 77, the last double word of the previous quadword is loaded from L2HI register into the S1 register. When the second quadword of a line is loaded, the double word in bit positions 0–63 of the first quadword is loaded into the S2 register 78 from the L2LO register 76. This double word is retained in the S2 register until the last quadword of the eight-quadword line has been loaded into the L2LO and L2HI registers 76 and 77. At the next available cycle for quadword transfer following loading of the last quadword of the current line, the double word is transferred out of the S2 register 78 through the multiplexer 74 into the L2LO register 76.

Refer now to FIG. 7 for an understanding of how compounding proceeds according to the instruction compounding unit of FIG. 6. Bits 64:127 of quadword i are held in the bit positions 0:63 of the S1 register 75. Relatedly, these positions are occupied by two half words 80 and 81, forming word 82, and half words 84 and 85, forming word 86. Bit positions 0:63 of quadword i+1 are in the corresponding bit positions of L2LO register 76. Bit positions 0:31 are occupied by half words 87 and 88, forming full word 89.

Recall that the worst case compounding process requires that a C bit be generated for each half word in an instruction byte stream. Therefore, the instruction compounding unit of FIG. 6 will generate a compounding bit for each of the half words of the quadword which is shown, in part, in FIG. 7. In generating C bits it is assumed that each half word is potentially either a two-or four-byte instruction. (Six-byte instructions are not compounded in this example, although it is contemplated by the inventors that instructions of any size can be compounded). A compounding box (CBOX) 62*a* of the rules base unit 62 (FIG. 6) generates a C bit for the half word 80 occupying bit positions 0:15 in the S1 register 75. The C bit for this half word is generated by the application, in CBOX 62*a*, of the compounding rules given above. Thus, the CBOX 62*a* must first determine whether the half word 80 contains the entirety of a two-byte instruction or the first half of a four-byte instruction. The CBOX 62*a* must also compare the operand of the instruction beginning in the half word 80 with the succeeding instruction to determine whether each instruction is in a category which can be compounded with the other instruction; it must also determine whether any interlocks exist between the two instructions in the form of data dependency or address generation hazards. Thus the CBOX must compare instruction op codes and operand and addressing registers of the two instructions.

The CBOX 62*a* assumes that an instruction begins in the half word 80. Recalling the instruction formats illustrated above in FIG. 5, it will be appreciated that the first 12 bits of the half word 80 will provide the instruction op code, the length code field of the instruction, and r1. If the length field code of instruction in the half word 80 decodes to a two-byte instruction, the CBOX 62*a* assumes that the next instruction begins with the half word 81. In order to determine whether an instruction beginning in half word 81 can be compounded with an instruction in half word 80, the CBOX 62*a* must have access to the 20 bits beginning in half word 81 and extending to the first 4 bits in the half word 84. These 20 bits are required in case the instruction beginning in the half word 81 is 4 bytes long, in which case, the first byte includes the instruction op code, the second byte, designations of r3 and r4, and the following half byte, the designation of (possibly) register r5.

Continuing with the assumption that the instruction in the half word 80 is a two-byte instruction, the CBOX 62*a* receives bits 0:11 of the half word 80 at input I1 and bits 16:35 beginning with the half word 81 at input I21, giving it enough information to determine instruction size, op code compatibility, and any interlocks.

Assuming that the length field code in bits 0:1 of the half word 80 indicate that the instruction is four bytes long, the CBOX 62*a* must have access to the 20 bits beginning with the half word 84, since the half word 81 is included in the instruction beginning in the half word 80. These 20 bits are obtained from register positions 32:51 of the S1 register, which embrace all of the half word 84 in the first four bits of the half word 85. The 20 bits for the second instruction following a four byte instruction are applied at I22 of the CBOX.

Attention is drawn to the fact that determination of the compoundability of an instruction beginning in a half word 81 with the following instructions requires access to the 20 bits beginning in the half word 84, and to the 20 bits beginning in the half word 85. However, as explained above, the 20 bits beginning in the half word 85 include the first 4 bits of the half word 87 in the register 76. Therefore the input to the CBOX which determines the compounding bit value for the half word 81 receives at its I22 input the 20 bits comprising bits 48:63 in the S1 register 75 and bits 0:3 in the half word 87 stored in bits 0:15 of the L2LO register 76.

Returning to the instruction compounding unit of FIG. 6, eight CBOX circuits 81–87 are shown. The CBOX circuits perform the actual compounding analysis according to the worst case scenario in which an instruction stream has variable length instructions intermixed with data and no reference to indicate where the first instruction of the cache line is. Since, in the System/370 example, all instructions are aligned on half word boundaries, a starting point for instructions is presumed, that reference point corresponding with bit position 0 of the first quad- word received in a cache line.

Each of CBOXs 80–87 generates a C bit for a respective one of the eight half words contained in the S1 and L2LO registers 75 and 76. Each box receives, at its I1 input, the first 12 bits of a respective one of the half words, and at its I21 and I22 inputs, the first 20 bits beginning with the first and second half words following that which provides the I1 input. Thus, for example, the CBOX 80 corresponds to the CBOX 62*a* of FIG. 7 in that it receives the first 12 bits of the first half word in the S1 register at its I1 input, the 20 bits beginning with the second half word in the S1 register at its I21 input, and the 20 bits beginning with the third half word in the S1 register at its I22 input. In response, the CBOX 80 generates a C bit for the first half word of the S1 register.

The CBOX 81 generates a C bit for the second half word of the S1 register. It is noted that input I22 of CBOX 81 receives the 20 bits beginning with the last half word of the S1 register (bits 48:63) and continuing to the first four bits of the first half word in the L2IO register 76. Similarly, C bits are generated for the third and fourth half words in the S1 register by CBOXs 82 and 83, while the CBOXs 84–87 generate C bits for the first, second, third, and fourth half words in the L2LO register 76.

In the register 64, there are illustrated in FIG. 6, 16 separate 4-input, 4-output D registers 100–115. Each of the even-numbered registers receives an input from each of CBOXs 84–87, while each of the odd-numbered registers receives an input from each of the CBOXs 80–83. In FIG. 6, C bits from the CBOXs 81, 82, and 83, are provided through truncation elements 90, 91, and 92 respectively. For so long as a TRUNCATE signal output by the FSM 66 is low, the C bits input into circuit elements 90, 91 and 92 are forwarded through those elements to the odd-numbered latches of the register 64.

The instruction compounding unit in FIG. 6 is designed to correctly perform compounding for an arbitrarily rotated cache line, observing the following conditions:

1. No compounding occurs across cache lines. That is, the last instruction in QW7 of a cache line is not compounded with the first instruction in QW0 of a following cache line;

2. Up to the last three C bits for a line, that is the C bits for the last three half words of QW7, are truncated by being forced to 0, in view of condition (1); and 3. If the cache line has been rotated such that a quadword other than QW0 is received first, then compounding analysis is performed for instructions lying on the boundary between last and first quadwords received.

In order to compound between the last and first quadwords of a rotated cache line, the S2 register 78 receives the first four half words from the first quadword loaded from the bus 60 and retains them until the last quadword has been received, at which time, contents of the S2 register 78 are gated through the multiplexer 74 into the L2LO register 76.

The controlling finite state machine 66 is of conventional design and responds to the following input signals:

FIRSTQW, which is asserted when the first quadword of the cache line is placed on the bus 60;

LASTQW, which is asserted when the last quadword of the cache line is on the bus 60;

EOL (End of Line), which is asserted when QW7 is on the bus 63; and

NUMFQW, which is the number (0 to 7) of the first quad word transferred on the bus 60, and which is valid when FIRSTQW=1.

These signals are produced by the cache management unit 44 (FIG. 4) in the course of a protocol which controls transfer of cache lines from the high level storage 36 to the compound instruction cache 38 in response to a cache miss.

The finite state machine 66 which controls the instruction compounding unit in FIG. 6 produces the following signals:

LD_L2, signifying load the L2LO and L2HI registers;

LD_S1, which signifies loading the S1 register;

LD_S2, which signifies loading the S2 register;

GT_S2_L2LO, signifying gating of the contents of the S2 to the L2LO register;

LD_CVR (0:15), signifying loading of the C-vector register 64. Each bit of this signal loads a corresponding four-signal register, that is, if LD_CVR (0)=1, the register 100 is loaded; if LD_CVR (1)=1, the register 101 is loaded. Preferably, in the design illustrated in FIG. 6, two LD_CVR lines may be asserted simultaneously; and TRUNCATE, which is activated in order to zero the C bits for instructions in the 6th, 7th and 8th half words in QW7.

Timing of the Instruction Compounding Unit

Figure 8A:
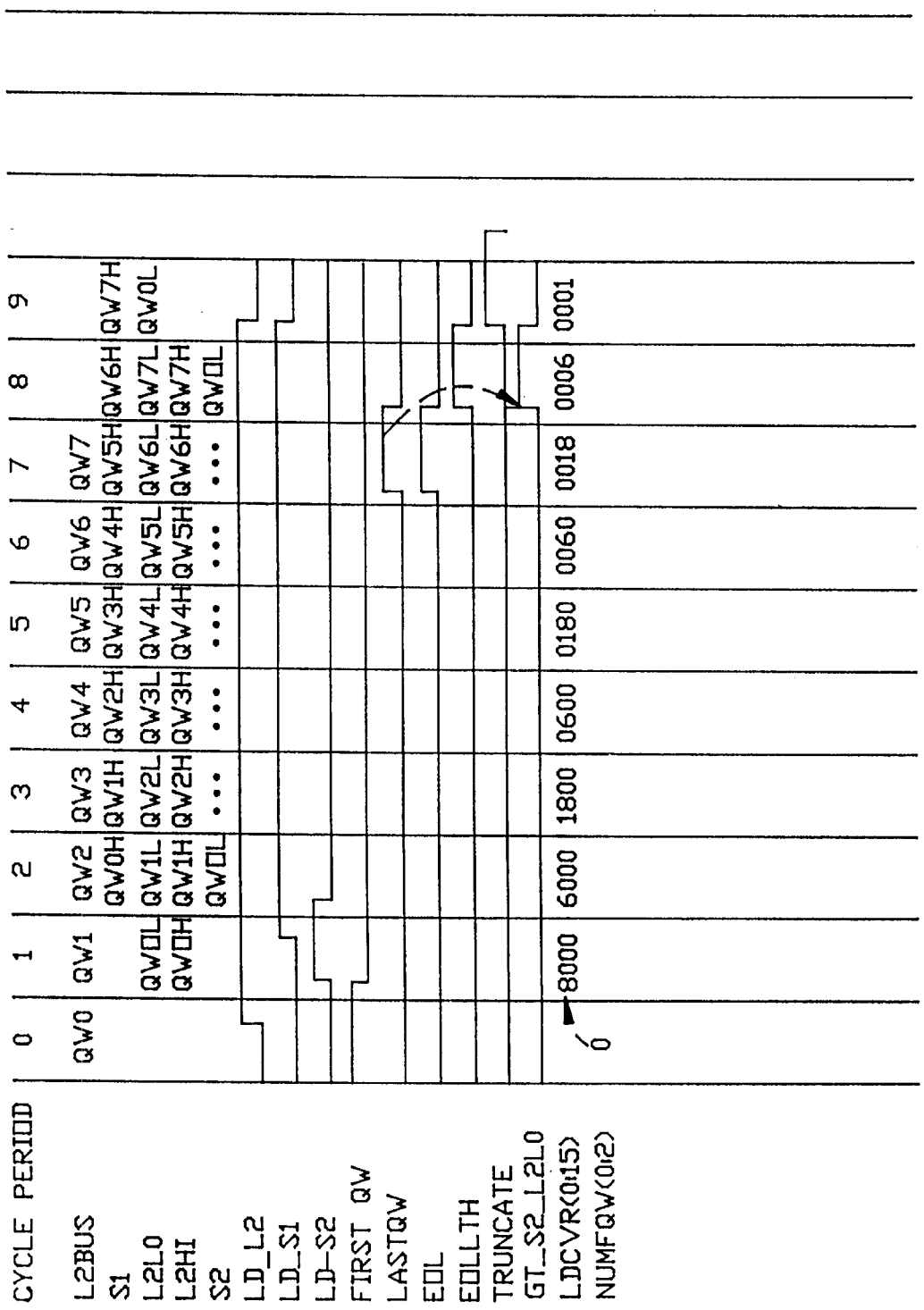
FIGS. 8A, 8B, and 8C are timing diagrams which illustrate operation of the invention according to various conditions.
Figure 8B:
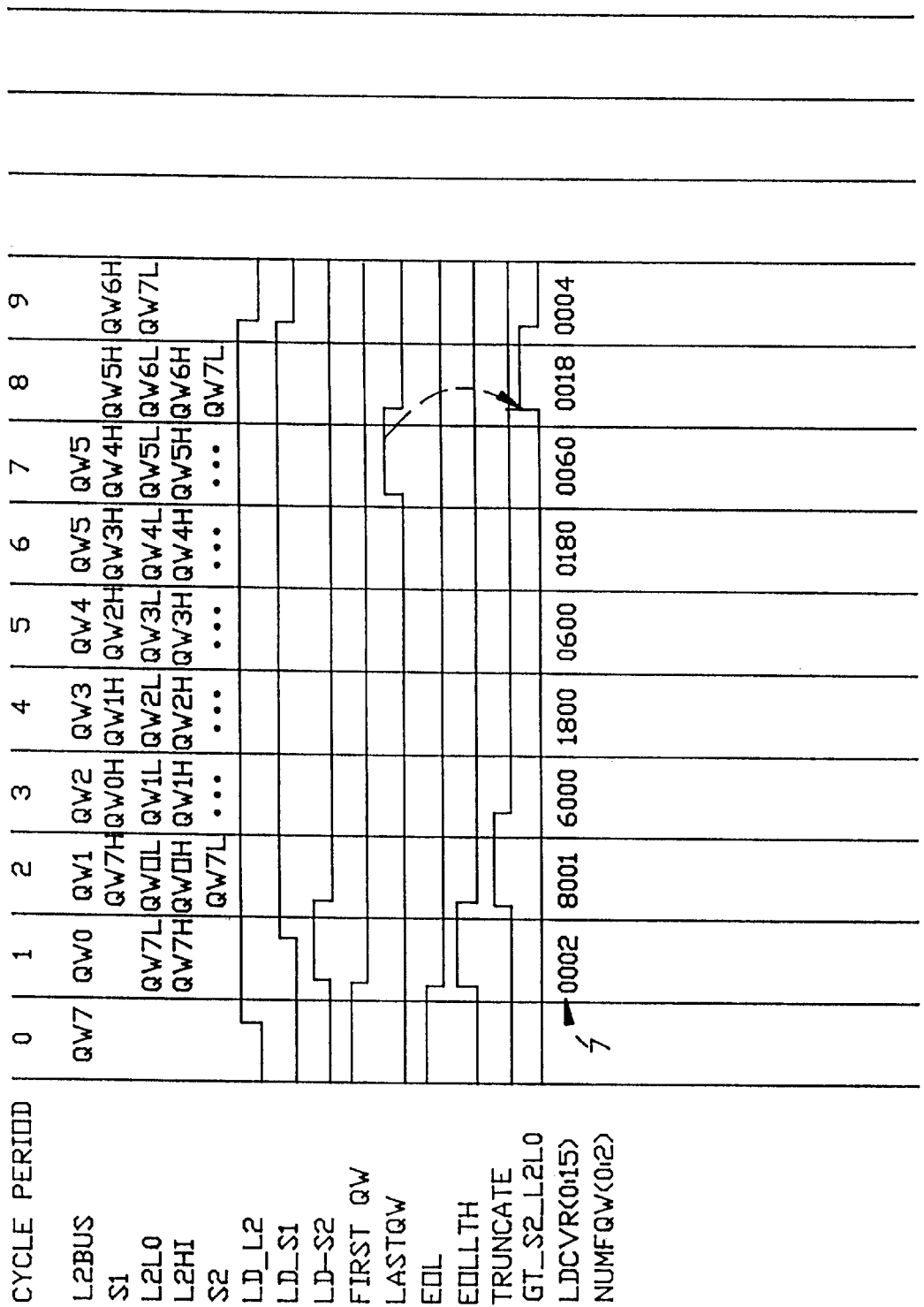
Figure 8C:
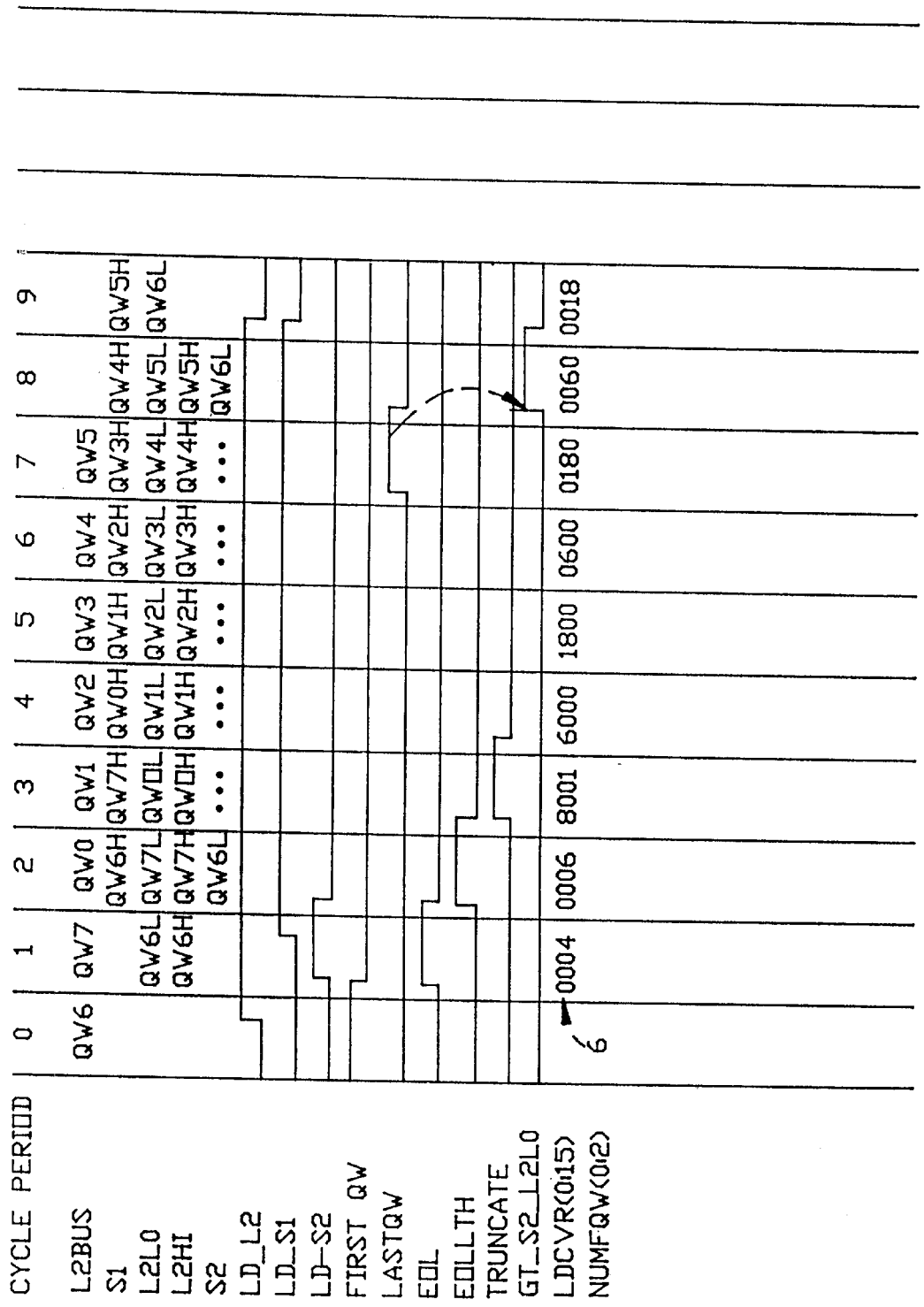

FIGS. 8A–8C show the timing of the instruction compounding unit in FIG. 6 for three representative rotations of incoming cache lines. The unit operates in a cycle of ten periods. In these figures, an eight quadword line is transferred, one quadword at a time in eight successive cycles on the bus 60. The current quadword on the line is designated as QWN, where N=0, 1, . . . , 7. As the quad words are registered, they are designated as QWNL or QWNH, where "L" signifies bits 0:63 of quadword QWN, while "H" signifies bits 64:127 of QWN.

With reference now to FIG. 8A, the compounding of the non-rotated cache line will be explained. In FIG. 8A, the eight quadwords of the cache line are sequentially sent on the bus 60 for storage in the cache. The presence of the first quadword of the transfer is signified by the signal FIRST_QW, which is asserted during cycle period 0 when QW0 is on the bus 60, and which falls slightly past the beginning of period 1, when QW1 is on the bus. While the signal FIRST_QW is valid, the FSM 66 gates in the NUMFQW signal. The NUMFQW signal initializes a nine state cycling counter to a state representing the number of the first quadword on the bus. In FIG. 8A, NUMFQW has a (decimal) value of 0, indicating that quadword QW0 is on the bus. In response to the signals FIRST_QW and NUMFQW, the FSM 66 activates the LD_L2 signal which loads the quadwords from the bus 60 in their arrival sequence into the L2LO and L2HI registers 76 and 77.

Late in the second cycle period, the FSM 66 raises the LD_S1 signal, which loads the S1 register 75 with the HI double word in the L2LO register 76 in the third cycle period. Thereafter, in each remaining cycle period the S1 register 75 receives the half word loaded in the L2HI register 77 during the previous cycle period until the LD_S1 signal falls. In the second cycle period, FSM 66 also pulses the LD_S2 signal, loading into the S2 register the lower double word of the first quadword received on the L2 bus 60. When the last quadword is being placed on the L2 bus 60, the LASTQW signal input to the FSM 66 is activated. In response, in the ninth cycle period of the compounding process, the FSM generates the GT_S2_L2LO signal, gating the contents of the S2 register in the L2LO register 78 in the tenth cycle period. The last quadword of the line, that is QW7, is signified to the FSM 66 by the EOL signal. This signal is latched by the FSM 66 for one period, represented by the EOLLTH signal which is internal to the FSM. In the cycle period following the EOLLTH signal, the FSM 66 activates the TRUNCATE signal and deactivates the LD_L2 and LD_S1 signals.

Therefore, for an unrotated cache line, quadwords are placed on the bus 60 in each of a sequence of eight cycle periods. In all, a ten cycle period defines the sequence for latching quadwords of the cache line and generating C bits for every half word in the line. Initially, in cycle period 0, QW0 is placed on L2 bus 60. In cycle period one, QW0 is latched in the staging unit 61, with its lower double word QW0L in the L2LO register 77 and its upper double word QW0H in the L2HI register 76. In the cycle period 2, the double word QW0L is latched in the S2 register 78, where it is held until cycle period 8. At the same time, the next quadword, QW1 is latched into the registers 76 and 77, while the contents of the L2HI register 76 are transferred into the S1 register 75. The sequence of entering the quadword into the registers 76 and 77 and transferring the high double word of the previous word into register 75 is repeated for cycle periods 3–8. In the last cycle period, the contents of register 78 are transferred back into the register 76, while the high double word of the previous cycle is transferred into register 75.

C bits are generated by the compounding unit 62 and latched into the CVR register 64 in cycle periods 1–9. In cycle period 1, C bits are generated only for the four half words in the register 76, while in cycle periods 2–8, C bits are generated and latched for the half words in the registers 75 and 76. In cycle period 9, C bits are generated only for the S1 register 75. Activation of the TRUNCATE signal forces the C bits for the last three half words in QW7H to 0.

Latching of the C bits generated in the sequence described above can be understood with reference to the LDCVR and NUMFQW signals in FIG. 8A. The NUMFQW signal is a three-bit signal which is valid while the FIRST-QW signal is active. The decimal value represented by the digits of the signal correspond to the number of the first quadword being transferred. For the unrotated line in FIG. 8A, the value is 0 (decimal). The FSM 66 uses the value of NUMFQW to initialize a state sequence having nine states. During the first and ninth states of the sequence, only one LDCVR signal is generated; during the other seven states, two LDCVR signals are generated. In FIG. 8A, LDCVR signals are given as a hexadecimal representation of the 16-bit LDCVR signal. Each hexadecimal digit represents four consecutive bits of the LDCVR signal. The first hexadecimal digit represents LDCVR bits 0–3, the second, bits 4–7, the third, bits 8–11, and the fourth, bits 12–15. Each bit of the LDCVR signal loads the correspondingly-numbered 4-bit CVR register. Thus, for example, LDCVR0, when active, loads the 4-bit CVR register 100, while LDCVR11, when active, loads the 4-bit CVR register 111. In cycle period 1 of FIG. 8A, the hexadecimal representation of the LDCVR signal is 8000. This means that the first hexadecimal digit has the value "1000". Thus, the load signal for the 4-bit register 100 is active, meaning that the C bits for the half words in the L2LO register 76 are being latched into the CVR register. In cycle period two, the first digit of the hexadecimal number is "6" while all the other digits are "0". Decoding the first digit gives the binary number "0110". Relatedly, the load signals for the 4-bit registers 101 and 102 are active. The 4-bit register 101 receives the C bits generated by the CBOXs 80–83 for the half word in the S1 register 75, which is QW0H in cycle period two. Similarly, the 4-bit register 102 is loaded with the C bits generated in CBOXs 84–87 for QW1L. The sequence of FIG. 8A proceeds through cycle periods 3–8 with the C bits generated by compounding across the quadword in the S1 and L2LO registers 75 and 76 being captured in the appropriate pair of 4-bit CVR registers. In cycle period 9, the last hexadecimal digit of the LDCVR signal has a value of "1" corresponding to the binary value of "0001", which loads the 4-bit CVR register 115 with the final four C bits for the cache line.

FIG. 8B illustrates the quadword loading and C bit generation cycle in the case where a cache line has been rotated to place the last quadword, QW7, first on the bus 60. In this case, the EOL signal is concurrent with the FIRST_QW signal. Consequently, the EOLLTH signal is generated internally to the FSM 66, delaying the EOL signal for one cycle period and resulting in the generation of the TRUNCATE signal during cycle period two. The TRUNCATE signal prevents the compounding of the last three half words in QW7H with any instruction. As described below, such compounding is prevented by forcing the C bits for the last three half words of QW7H to 0. However, the lower double word in QW7, that is QW7L, is retained in the S2 register 78 until cycle period nine when it is entered into the L2LO register 76 for compounding with the instructions in QW6H. The initial value of NUMFQW synchronizes the generation of the LDCVR signals with the order of the rotated cache line.

FIG. 8C illustrates the ten-period cycle for compounding a rotated cache line in which the first quad word is neither QW0 nor QW7.

Figure 9A:
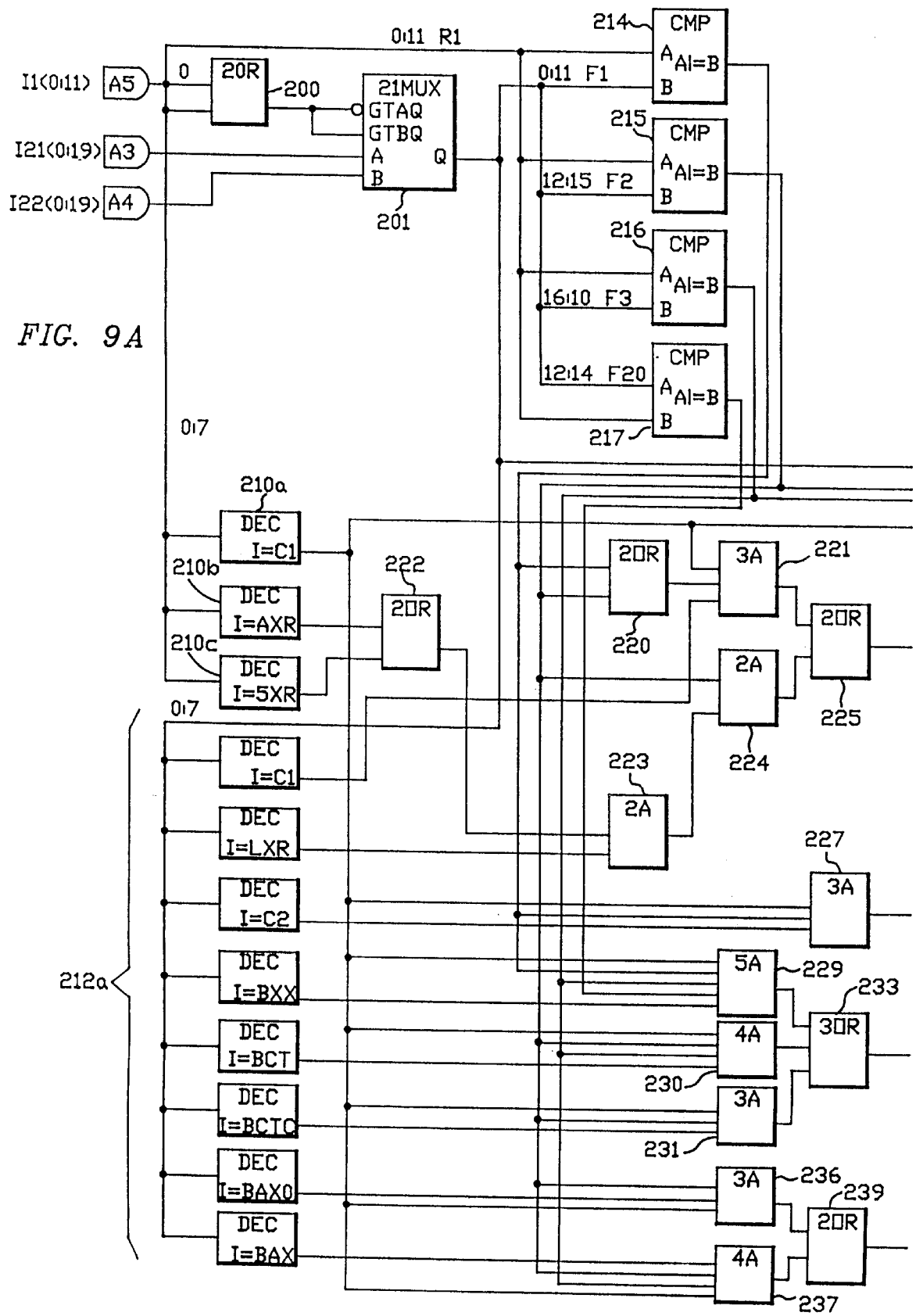
FIGS. 9A and 9B form a logic diagram illustrating in greater detail a rule-based analysis component of the instruction compounding unit of FIG. 6.
Figure 9B:
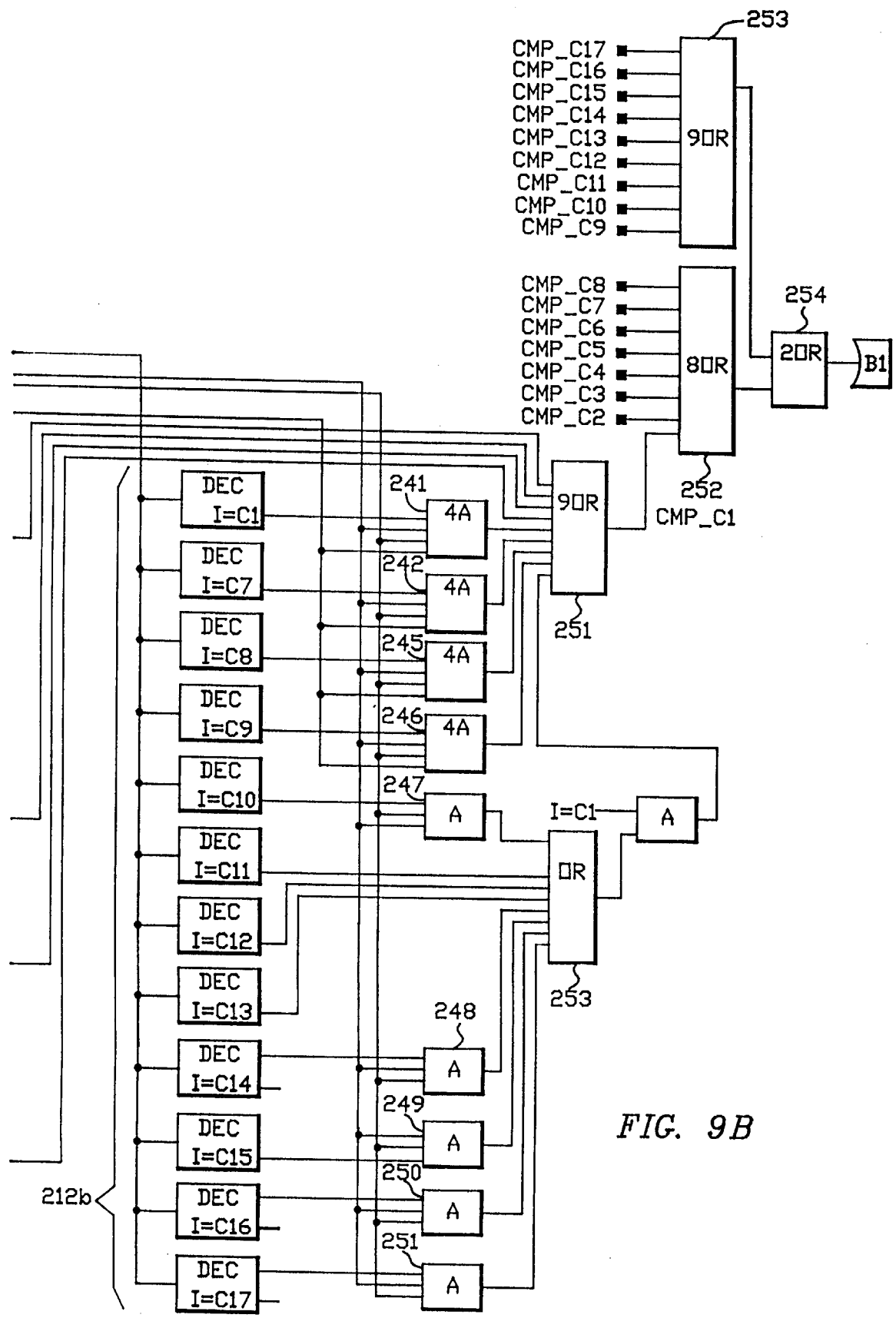

FIG. 9A and 9B (hereinafter "FIG. 9") shows a partial design for a CBOX. The design is partial in that only compounding rules for category 1 instructions are shown. Such compounding is instructive since category 1 is the worst-case category and places an upper bound on the design complexity of a CBOX. The skilled artisan will be able to derive corresponding logic which implements compounding rules for categories 2–12.

The inputs to the CBOX are I1 (0:11), the first twelve bits of the first half word in a pair of instructions. Following this, this half word will be referred to as "instruction 1". As discussed above in connection with FIG. 7, these bits contain the op code and r1 fields of the half word being considered for compounding. Because instruction 1 can be either a two-or four-byte instruction, two choices are possible for the second instruction (I2): if instruction 1 is a single half word, (bits 0:1="00"), then instruction 2 comes from the next half word following instruction 1. This corresponds to input I21 (0:19). As discussed above, instruction 2 may be a four-byte instruction, in which case the first 20 bits of the instruction text are required for compounding analysis. If bits 0:1 of I1="01", "10", or "11" instruction 2 comes from input I22 (0:19). These are the first twenty bits in the second half word following instruction 1.

Once the instruction length of instruction 1 is determined, instruction 1 and instruction 2 are decoded by decode blocks (DEC) as required. In this regard, the decode blocks simply decode the instruction op codes, producing an active output only if the op code corresponds with a predetermined category op code pattern employed by the decode block. At the same time, the first operand of instruction 1 is compared with the potential operand and address register fields of instruction 2 to determine whether any data or address generation interlocks exist. Dependency indications are combined with the op code decoding in a manner which implements the compounding rules given above. The signal generated by the logic of FIG. 9 (termed "category 1" logic) is a signal CMP_C1, which is asserted if instruction 1 is in category 1 and compoundable with instruction 2. This signal is combined with signals CMP_C2 through CMP_C17, which correspond to instruction 1 being in a category from 2 through 17. The final result is the C bit output which is asserted if instruction 1 compounds with instruction 2.

Returning now to FIG. 9 and referring to instruction 1 as "I1" and instruction 2 as "I2", the first 12 bits of I1 are received at input A5. Bits 0:1 of I1 are fed to the input of OR gate 200 whose output is activated if either of these bits is set. Either bit being set signifies that I1 embraces more than two bytes. An inactive output of the OR gate 200 signifies that I1 is a two-byte instruction. The output of the OR gate 200 controls a multiplexer 201. If the output of the OR gate 200 is inactive input A3 is output by the multiplexer 201. The input at A3 is the I21 input which constitutes bits 0:19 from the half word immediately following I1. Otherwise, if the output of the OR gate 200 is activated, the input at A4 is selected by the multiplexer 201. As illustrated, the input at A4 is I22, constituting the first 20 bits (0:19) of the second half word after I1. The op code portion (bits 0:7) of I1 is decoded in three decoders 210a, 210b, and 210c. All of these decoders decode category 1 instructions. Further, decoder 210b decodes either an AR or an ALR instruction, while decoder 210c decodes an SR or an SLR instruction.

The op code of the half word selected by the multiplexer 201 is fed to a bank of decode blocks 212a and 212b. If the op code satisfies the decoding condition of one of the blocks, the decoding block will activate. The decoding block conditions are listed in Table I. For example, if I2 has an op code which is decoded as a branch on count, the decoder denoted as I=BCTR will activate its output.

TABLE I

| I = C1 | Instruction is Category 1 |
|---|---|
| I = AXR | Instruction is AR, or ALR |
| I = SXR | Instruction is SR, or SLR |
| I = LXR | Instruction is LPR or LNR |
| I = C2 | Instruction is Category 2 |
| I = BCT | Instruction is BCT |
| I = BCTR | Instruction is BCTR |
| I = BAXR | Instruction is BASR |
| I = BAX | Instruction is BAS |
| I = C6 | Instruction is Category 6 |
| I = C7 | Instruction is Category 7 |
| I = C8 | Instruction is Category 8 |
| I = C9 | Instruction is Category 9 |
| I = C10 | Instruction is Category 10 |
| I = C11 | Instruction is Category 11 |
| I = C12 | Instruction is Category 12 |
| I = C13 | Instruction is Category 13 |
| I = C14 | Instruction is Category 14 |
| I = C15 | Instruction is Category 15 |
| I = C16 | Instruction is Category 16 |
| I = C17 | Instruction is Category 17 |

Comparisons of register fields for I1 and I2 are performed in comparison (CMP) blocks 214–217. These comparisons are for the purpose of identifying dependencies which may constitute interlocks. Each of these blocks compares register r1 identified in bits 8:11 of I1 with the contents of the register field locations of I2. If the compared values are unequal, the output of a CMP block is active; if equal, the output is inactivated. In this regard, bits 8:11 of I2 correspond with register r3, bits 12:15 with register r4, and bits 16:19 with register r5. The comparison block 217 is provided to compare register r1 with only the first three bits of the r4 register field of I2. This comparison is used to detect execution dependencies between I1 and a BXH or BXLE instruction where bits 12:15 identify an even register but the instruction makes provision for comparison with an adjacent register with an odd number. In this case equivalence of bits 8:10 of I1 and bits 12:14 of I2 will signify equivalence of the register r1 with either of the odd or even registers designated in the r4 field of I2. This, of course, indicates an execution interlock.

In FIG. 9, the remaining logic up to and including the OR gate 251 is provided for combining the register field comparisons with op code indications to determine whether I1 and I2 are instructions which can be compounded. If compoundable, the output of the OR gate 251 is asserted, which will result in activation of the C bit for the half word identified as I1.

With reference to the compounding rules given above, the remainder of the logic in FIG. 9 will be explained. In the first rule, the category 1 instruction is compoundable with another category 1 instruction, with two exceptions. The first exception is when r1 is equal to both r3 and r4. This condition is tested in the OR gate 220, connected to comparison blocks 214 and 215. The output of the OR gate 220 is fed, together with the output of the decoder 210a and the decoder in the decoder bank 212 which decodes I=C1 to the AND gate 221. If the condition exception is not met, the output of the AND gate 221 will be asserted, indicating that the first exception to the compounding of two category one instructions does not apply. The second exception is listed above and occurs when the op code of I1 identifies an AR, an SR, an ALR, or an SLR instruction, the op code of I2 identifies an LPR or an LNR instruction, and r1=r4. The I1 op codes for this instruction are tested in the OR gate 222, while the AND gate 223 tests the concurrence of the I1 and I2 op code exceptions. Thus, if the output of the AND gate 223 is asserted, the op codes for I1 and I2 indicate instructions in the respective exception classes. The output of the AND gate 223 is combined in the AND gate 224 with the output of the comparator block 215. If r1=r4, the output of this block will be inactive, which will keep the output of the AND gate 224 from activating. If the comparator block 215 is active, indicating inequality of the registers, the output of the AND gate 224 will activate, indicating that the conditions of the exception have not been met. The outputs of the AND gates 221 and 224 are forwarded through the OR gate to the OR gate 251.

The AND gate 227 tests for compounding according to rule 2 of the compounding rules. Thus the gate is activated if the op code of I1 is in category 1, the op code of I2 is in category 2, and r1 does not equal r3.

The OR gate 233 applies rule 3 with its two exceptions. In this regard, if the op code of I2 decodes to BCTR, address generation dependency must be cleared. For the BCTR instruction, such dependency occurs if r1=r4. This exception is evaluated by the AND gate 231. The AND gate 230 checks for address generation dependency when I1 is a category 1 instruction and I2 is a BCT instruction. When I2 is a BCT instruction, address generation dependency occurs if r1=r4 or r5. To detect this dependency, the AND gate 230 receives inputs from comparison blocks 215 and 216. Occurrence of the last exception of the compounding rule 3 is detected by the AND gate 229. This exception arises when I2 is a BXH or BXLE instruction, in which case address generation dependency occurs if r1=r5, or execution dependency occurs if r1=r3, or r1=r4, or if r1 equals the odd or even register in the r4 field. Thus, if I1 is a category 1 instruction, I2 is a category 3 instruction, and none of the exceptions to rule 3 occur, the output of the OR gate 233 is activated.

Category 1 and 4 instructions are not compounded. If I1 is a category 1 instruction and I2 is a category 4, the output of OR gate 251 will remain inactive.

Rule 5 is implemented by the OR gate 239, with the two exceptions to rule 5 being tested, respectively in the AND gates 236 and 237.

Rules 6, 7, 8, and 9 are implemented, respectively, by AND gates 241, 242, 245, and 246.

The exceptions to rules 10 and 14–17 are tested in AND gates 247, 248, 249, 250, and 252. Rules 11–13 have no exceptions. The OR gate receives the outputs of the AND gates 247–250 and 252, and the outputs from the decoders for categories 11–13. The output of the OR gate 253 is combined with the output of the decoder 210a in AND gate 254 to test for compounding according to rules 10–17. The output of the AND gate 254 is fed to the OR gate 251.

The OR gate 251 collects the results of testing I1 and I2 according to the category 1 rules. The output of the OR gate 251 is combined with outputs of groups of CBOX logic which apply appropriate rules categorization for the cases where I1 is in any one of categories 2–17. The output of all category rule logic is collected in the OR gate 254 whose output at B1 provides the C bit for the half word identified as I1.

Truncation

Referring now to FIGS. 6, 8A and 8B, the truncation of compounding for the last three half words in QW7 will be explained. In FIG. 6, truncation components 90, 91, and 92 receive the C bits produced for the last three half words in register S1 by CBOXs 81, 82, and 83. Each of these elements is an AND gate circuit which receives a non-inverted C bit and the inverse sense of the TRUNCATE signal. When the TRUNCATE signal is inactive, the C outputs of the CBOXs are passed through the AND gates 90, 91, and 92, respectively. Activation of the TRUNCATE signal (refer to FIGS. 8A–8C) occurs when the last double word of QW7, including bits 64–127, is in the S1 register 75. At this point, the CBOX 83 attempts to determine compounding of the last half word in the S1 register with the first or second half word in the L2LO register 76. However, activation of the TRUNCATE signal, inverted at the input to the AND gate, inactivates the output of that gate and forcing the C bit for the half word at the I1 input of the CBOX 83 to zero. The next-to-last and last half words of QW7 are truncated in the same manner as the first by AND gates 91 and 90, respectively.

A Scalable Compound Instruction Set Machine Architecture

Figure 10:
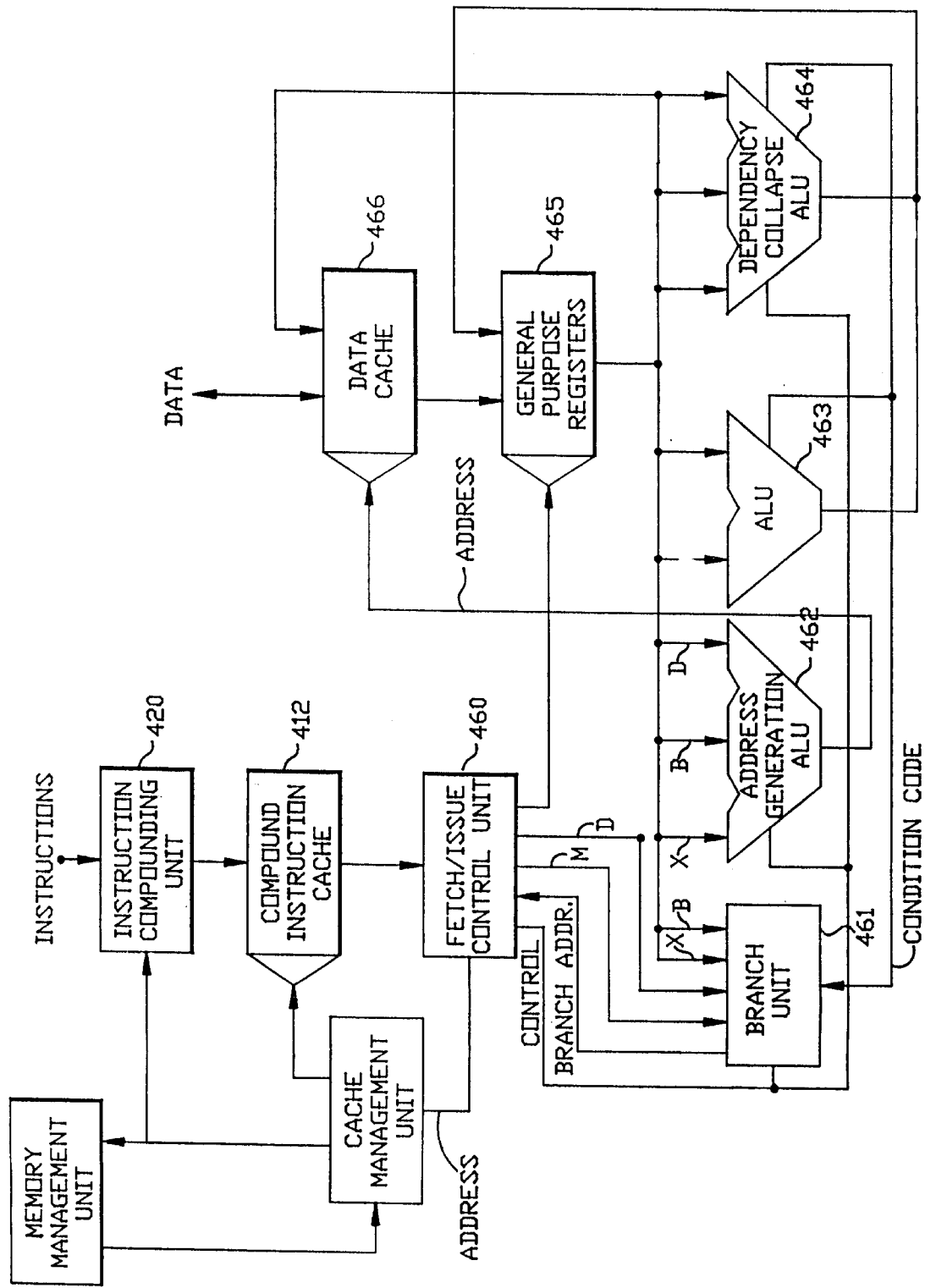
FIG. 10 is a block diagram of an industrial application of the invention.

Referring to FIG. 10, there is shown a detailed example of how a computer system can be constructed for using the compounding tags of the present invention to provide parallel processing of object code computer instructions. The instruction compounding unit 420 used in FIG. 10 is assumed to be of the type described in FIG. 6 and, as such, it generates for each instruction a one-bit tag. These tags are used to identify which pairs of instructions that may be processed in parallel. These instructions and their tags are supplied to and stored into the compound instruction cache 412. The fetch and issue unit 460 fetches the instructions and their tags from cache 412, as needed, and arranges for their processing by the appropriate one or ones of a plurality of functional instruction processing units 461, 462, 463 and 464. Fetch and issue unit 460 examines the tags and op code fields of the fetched instructions. If the tags indicate that two successive instructions may be processed in parallel, then fetch and issue unit 460 assigns them to the appropriate ones of the functional units 461–464 as determined by their op codes and they are processed in parallel by the selected functional units. If the tags indicate that a particular instruction is to be processed in a singular, nonparallel manner, then fetch and issue unit 460 assigns it to a particular functional unit as determined by its op code and it is processed or executed by itself.

The first functional unit 461 is a branch instruction processing unit for processing branch type instructions. The second functional unit 462 is a three input address generation arithmetic and logic unit (ALU) which is used to calculate the storage address for instructions which transfer operands to or from storage. The third functional unit 463 is a general purpose arithmetic and logic unit (ALU) which is used for performing mathematical and logical type operations. The fourth functional unit 464 in the present example is a data dependency collapsing ALU of the kind described in the above-referenced co-pending application Ser. No. 07/504,910. This dependency collapsing ALU 464 is a three-input ALU capable of performing two arithmetical/logical operations in a single machine cycle.

The computer system embodiment of FIG. 10 also includes a set of general purpose registers 465 for use in executing some of the machine-level instructions. Typically, these general purpose registers 465 are used for temporarily storing data operands and address operands or are used as counters or for other data processing purposes. In a typical computer system, sixteen (16) such general purpose registers are provided. In the present embodiment, general purpose registers 465 are assumed to be of the multiport type wherein two or more registers may be accessed at the same time.

The computer system of FIG. 10 further includes a high-speed data cache storage mechanism 466 for storing data operands obtained from a higher-level storage unit (not shown). Data in the cache 466 may also be transferred back to the higher-level storage unit. A cache management unit receives instruction addresses from the control unit 460 and either moves the addressed instruction and its tag to the unit, or detects a miss and begins the process of moving a cache line into the cache.

The particular mode in which the tags accompany compounded instructions for storage in the cache 466 is a matter of design choice. In many of the cross-referenced applications, the tags are inserted into the compounded instruction stream, with each tag bit appended to the half word for which it was generated. For purposes of illustration, a technique for providing tag bits for storage and use with a cache line is illustrated in FIG. 11. As FIG. 11 shows, instructions may occupy six, four, or two bytes. For the example of this invention, the compounding rules apply only to instructions of two or four bytes' length. Instructions which are six bytes in length are not compounded. However, tags are generated for every half word in a cache line. As FIG. 11 illustrates, the tag bits are preferably assembled into a C-vector which is separate from the compounded cache line. In FIG. 11, a portion of a cache line including quadwords QWI and QWI+1 is indicated by 390, while the accompanying tags are shown in the form of a C-vector 372. It will be obvious to those reasonably skilled in the art that the C-vector can be formed by parallel extraction of C bits registered in the CVR64 of FIG. 6. With the compounding bits vectored as illustrated in FIG. 11, there are a number of ways to implement their storage in cache. FIGS. 12A and 12B illustrate two such ways. FIGS. 12A and 12B both assume a quadword-wide bus, which comports with the bus 60 in FIG. 6, plus extra lines between the instruction compounding unit and the compound instruction cache for tags. Further, in keeping with the example explained above, the cache line is assumed to be eight quadwords in length, with the instruction compounding unit generating one compounding bit for every two bytes of text in a cache line. Thus, 64 compounding bits are generated for each compound cache line. These bits must be accommodated in a cache architecture which associates the compounding bits with their respective half words.

The simplest implementation for caching compounding bits with an associated cache line would see an increase in the internal word size of the processor between the cache and the instruction fetch and issue unit, as illustrated in FIG. 12A. This implies that the compounding bits are appended to quadwords, or inserted into the instruction stream at each half word. In FIG. 12A, a cache line organized into eight storage locations is illustrated. Without compounding, each location is eight bytes wide. With eight locations, a 16 byte cache line is stored. With one compounding tag per half word, and two-way compounding, a minimum of one extra bit of storage for every half word of instruction text is required. Thus, eight compounding bit locations are required for every sixteen bytes. The implication is that the cache word size must be expanded from 128 to 136 bits. FIG. 12A illustrates a cache structure for two-way compounding and a quadword-wide cache bus. The cache bus and internal word size are expanded to 136 bits. The drawback to this scheme is that a new memory design is required, implying, for example, error correction for larger words.

A second approach is illustrated in FIG. 12B and utilizes a tag cache that is separate from, but operated in parallel with, the instruction cache. This structure implies that tags are separate from the instruction text. However, as with FIG. 12A, the requirement that the tags accompany their respective instructions necessitates expansion of the bus between the cache and the instruction fetch and issue unit. In this case, the internal cache word size is unchanged; however, the size of the bus between the cache and the instruction fetch and issue unit must increase to accommodate parallel operation of the tag cache. The design of FIG. 12B may be hardwired. Alternatively, a separate tag cache management unit would be provided.

Example of SCISM Operation

Figures 13, 14:
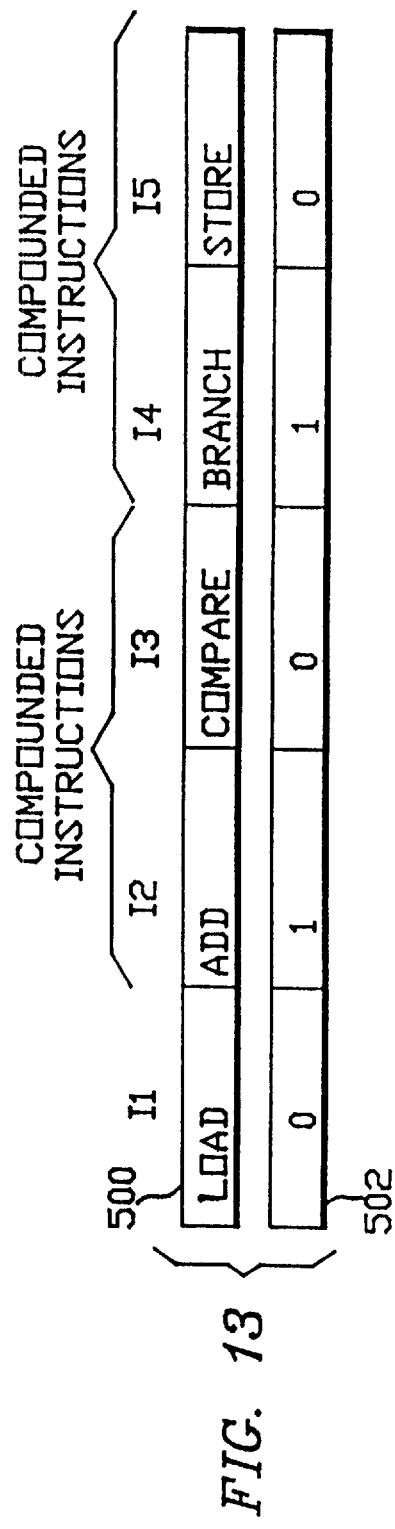
FIG. 13 illustrates a fragment of an instruction stream analyzed according to the invention with an accompanying information vector containing the results of the analysis.
FIG. 14 is a chart which shows how the instructions of FIG. 13 are executed in response to the accompanying analysis information.

FIG. 13 shows an example of a compounded instruction sequence 500 which may be processed by the computer system of FIG. 10. The FIG. 13 example is composed of the following instructions in the following sequence: Load, Add, Compare, Branch on Condition and Store. These are identified as instructions I1–I5, respectively. The tags for these instructions are 1,1,0,1 and 0, respectively. These tags are arrayed in a C-vector 502 which accompanies the instructions 500. Because of the organization of the machine shown in FIG. 10, the Load instruction is processed in a singular manner by itself. The Add and Compare instructions are treated as a compound instruction and are processed in parallel with one another. The Branch and Store instructions are also treated as a compound instruction and are also processed in parallel with one another. When these instructions are provided to the instruction fetch/issue unit, they are accompanied by the C-vector 502.

The table of FIG. 14 summarizes information for each one of the FIG. 13 instructions. The R/M column in FIG. 14 indicates the contents of the first field in each instruction. As discussed above, this field is typically used to identify a particular one of the general purpose registers which contains the first operand. An exception is a case of the Branch on Condition Instruction, wherein the R/M field contains a condition code mask. The R/X column of FIG. 14 indicates the contents of the field in two-byte instructions which identifies the second operand register and which, in four-byte instructions, identifies the register containing the address index value. The B column in FIG. 14 indicates the contents of the register field in a four-byte instruction identifying the base register. As is conventional with System/370 instructions, a zero in the B column indicates the absence of a B field or the absence of a corresponding address component in the B field. The D field of FIG. 14 indicates the content of a further field in each instruction which, when used for address generation purposes, includes an address displacement value. A zero in the D column may also indicate the absence of a corresponding field in the particular instruction being considered or, alternatively, an address displacement value of zero.

Considering now the processing of the Load instruction of FIG. 13, the fetch/issue control unit 460 determines from the tags for this Load instruction that the Load instruction is to be processed in a singular manner by itself. The action to be performed by this Load instruction is to fetch an operand from storage, in this case the data cache 466, and to place such operand into the R2 general purpose register. The storage address from which this operand is to be fetched is determined by adding together the index value in register X, the base value in register B and the displacement value D. The fetch/issue control unit 460 assigns this address generation operation to the address generation ALU 462. In this case, ALU 462 adds together the address index value in register X (a value of zero in the present example), the base address value contained in general purpose register R7 and the displacement address value (a value of zero in the present example contained in the instruction itself. The resulting calculated storage address appearing at the output of ALU 462 is supplied to the address input of data cache 466 to access the desired operand. This accessed operand is loaded into the R2 general purpose register in register set 465.

Considering now the processing of the Add and Compare instructions, these instructions and their tags are fetched by the fetch/issue control unit 460. The control unit 460 examines the tags for these two instructions and notes that they may be executed in parallel. As seen from FIG. 14, the Compare instruction has an apparent data dependency on the Add instruction since the Add must be completed before R3 can be compared. This dependency, however, can be handled by the data dependency collapsing ALU 464. Consequently, these two instructions can be processed in parallel in the FIG. 11 configuration. In particular, the control unit 460 assigns the processing of the Add instruction to ALU 463 and assigns the processing of the Compare instruction to the dependency collapsing ALU 464.

ALU 463 adds the contents of the R2 general purpose register to the contents of the R3 general purpose register and places the result of the addition back into the R3 general purpose register. At the same time, the dependency collapsing ALU 464 performs the following mathematical operation:

R3+R2−R4

The condition code for the result of this operation is sent to a condition code register located in branch unit 461. The data dependency is collapsed because ALU 464, in effect, calculates the sum of R3+R2 and then compares this sum with R4 to determine the condition code. In this manner, ALU 464 does not have to wait on the results from the ALU 463 which is performing the Add instruction. In this particular case, the numerical results calculated by the ALU 464 and appearing at the output of ALU 464 is not supplied back to the general purpose registers 465. In this case, ALU 464 merely sets the condition code.

Considering now the processing of the Branch instruction and the Store instruction shown in FIG. 13, these instructions and their tags are fetched from the compound instruction cache 412 by the fetch/issue control unit 460. Control unit 460 determines from the tags for these instructions that they may be processed in parallel with one another. It further determines from the op codes of the two instructions that the Branch instruction should be processed by the branch unit 461 and the Store instruction should be processed by the address generation ALU 462. In accordance with this determination, the mask field M and the displacement field D of the Branch instruction are supplied to the branch unit 461. Likewise, the address index value in register X and the address base value in register B for this Branch instruction are obtained from the general purpose registers 465 and supplied to the branch unit 461. In the present example, the X value is zero and the base value is obtained from the R7 general purpose register. The displacement value D has a hexadecimal value of twenty, while the mask field M has a mask position value of eight.

The branch unit 461 commences to calculate the potential branch address (0+R7+20) and at the same time compares the condition code obtained from the previous compare instruction with the condition code mask M. If the condition code value is the same as the mask code value, the necessary branch condition is met and the branch address calculated by the branch unit 461 is thereupon loaded into an instruction counter in control unit 460. This instruction counter controls the fetching of the instructions from the compound instruction cache 412. If, on the other hand, the condition is not met (that is, the condition code set by the previous instruction does not have a value of eight), then no branch is taken and no branch address is supplied to the instruction counter in control unit 460.

At the same time that the branch unit 461 is busy carrying out its processing actions for the Branch instruction, the address generation ALIU 462 is busy doing the address calculation (0+R7+0) for the Store instruction. The address calculated by ALU 462 is supplied to the data cache 466. If no branch is taken by the branch unit 461, then the Store instruction operates to store the operand in the R3 general purpose register into the data cache 466 at the address calculated by ALU 462. If, on the other hand, the branch condition is met and the branch is taken, then the contents of the R3 general purpose register is not stored into the data cache 466.

The foregoing instruction sequence of FIG. 13 is intended as an example only. The computer system embodiment of FIG. 12 is equally capable of processing various other instruction sequences. The example of FIG. 13, however, clearly shows the utility of the compound instruction information in determining which pairs of instructions may be processed in parallel with one another.

Considerations of Industrial Application

The discussion above provides a hardware implementation for compounding instructions for parallel execution. It is asserted that this solution does not compromise the cycle time of the machine in which it is embodied. As the example of FIGS. 12–14 shows, it can support and even simplify the control of a large number of functional units. As FIGS. 6–11 show, the instruction compounding unit, the cache configuration and the instruction processing architecture which result are all feasible for implementation.

The compound instruction cache architecture gives rise to a number of distinct advantages in the industrial application of the invention. First, it eliminates the need for a software compounding facility, which permits the invention to be applied to existing instructions without modifying their object code forms and which can accommodate future codes, thereby obviating modification to compilers or assemblers. Next, the overhead required for storage of the compounding information is limited to the compound instruction cache. No overhead is imposed on any storage means standing above the cache in the memory hierarchy: not in the semiconductor memory (main memory), in the direct access device storage, or anywhere else. Further, the only time a performance penalty will occur for non-sequential operations is when the target instruction required for the operation is not in the cache. In the case of branches, the likelihood of that occurring is directly related to the miss ratio of the cache. It is entirely conceivable for a compound instruction cache of sufficient size to contain entire program loops of compound instructions, making the branch penalties negligible. Another advantage of this architecture is the ability of self-modifying code to be handled simply by trapping writes to the compound instruction stream, invalidating the cache line written to, requesting the updated line from the upper levels of the memory hierarchy, and recompounding the line. Last, even though the proposed architecture changes neither the amount nor the duration of the analysis that must be performed to attain a particular level of compounding (and, thus, parallelism), the analysis is performed only when a cache miss occurs and is thus infrequent by definition: no designer would purposefully build an instruction cache with a high miss ratio into a high-performance computer. The compounding analysis will increase cache miss service time by some amount proportional to the degree of analysis performed.

The first design consideration in developing an industrial application of this invention can be appreciated with reference to FIG. 6. The staging unit 61 effectively permits compounding over an entire quadword, which is precisely the unit of transfer between the main memory and the compound instruction cache. In matching the size of the unit of transfer into the cache, the compounding process can consider all available pairs of instructions as they are presented to the cache for storage therein. This reduces the time penalty for two-way compounding. In the general case, the size of the staging unit is a function of the number of instructions that constitute a single compound instruction and the scope of the analysis for compounding. In some cases it may turn out that increasing the size of the staging unit beyond a certain value may have diminishing returns.

The complexity of the instruction compounding unit will vary with the goals which compounding is intended to achieve. In this regard, the instruction compounding unit of FIG. 6 implements compounding rules for seventeen categories of instructions in a scheme which compounds at the maximum only two instructions. More complex compounding over, for example, three or more instructions can be accomplished by a compounding unit whose compounding section extrapolates the basic design of the CBOX illustrated in FIG. 9. Such a design may result in a more complex tag which would include control information, compounding information, steering bits, and other information of the type typically associated with horizontal microcode. The creation of compounding information and the semantics imputed to the tag are limited only by size constraints of the design and the time penalty ascribed to cache miss servicing. Relatedly, the tag can be as minimal or maximal as time and space allow. For example, consider the very frequent System/370 instruction pair Test Under Mask (TM) followed by Branch on Condition (BC). Given the high frequency of the instruction pair, compounding it alone for parallel execution can improve processor performance. Should a designer choose to compound only this pair, then the rules base for the compounding unit contains only one rule, and the CBOX and compounding unit become trivial. At the other extreme, the rules base may contain rules for subset, but still a substantial part of, a complete instruction-set architecture. It may additionally contain further information pertaining to the physical properties of the functional units, facilitating the embedding of control information in the tags. The rules base, though implementable in hardwired, random logic, may be implemented in some form of fast-access programmable storage, thereby allowing for flexibility as more functional units are added or subtracted, more or fewer types of compoundings are desired, or even as the computing environment changes. Relatedly, certain compoundings may be more advantageous in a commercial environment than in an engineering-scientific environment, or vice versa. This implies that the rules base can be programmable, with rules decisions being made at machine configuration time. Therefore, the inventors contemplate that, instead of being hardwired, the CBOX functions of the instruction compounding unit could be implemented in a fast-access, multi-ported memory which is programmable with a desired set of rules at the time a machine is manufactured.

Proposals have been made for decreasing the cache miss ratio by prefetching cache lines without waiting for a cache miss. If the cache management unit were designed to prefetch the next-sequential line of instructions, it would be possible to hide much of the time required by the instruction compounding unit for compounding. The fraction of all line compoundings that are hidden will be determined in this case by the program instruction-fetching behavior, as well as the organization for the compound instruction cache.

Certain specific design decisions have been incorporated into the discussion above for the purpose of presenting examples. Thus, this invention may be practiced by incorporation of C bits directly into the instruction stream at each half word boundary. Further, compound instructions could simply issue directly from the cache, rather than employing an instruction fetch/issue control unit with a buffer or stack. Also, when a cache miss and subsequent line fetch occur, it may be beneficial from a performance standpoint to pass the instruction addressed for execution directly to the functional units for execution at the scalar rate, rather than stall the functional units while the line is analyzed for compounding.

Therefore, while we have described what are considered to be preferred embodiments of this invention, it will be obvious to those skilled in the art in view of all of the considerations discussed above that various changes and modifications may be made to the invention without departing from its spirit. Therefore the invention and this description are intended to cover all changes and modifications as fall within the spirit and scope of the appended claims.

What is claimed is:

1. In a digital computer system including means for executing two or more instructions and a main memory and cache for storing instructions, a method for processing instructions for parallel execution, the method comprising the steps of:

storing a plurality of instructions in the main memory;

obtaining two or more instructions from the main memory for execution;

in response to the two or more instructions, generating compounding information signifying parallel execution of at least two instructions; and storing the at least two instructions and the compounding information in the cache.

2. The method of claim 1, wherein the plurality of instructions are in object code format and the step of generating includes generating the compounding information without altering the object code format of the instructions.

3. The method of claim 1, wherein the step of storing in the cache includes storing the compounding information only in the cache.

4. The method of claim 1, wherein the digital computer system includes means for providing a cache miss signal when an instruction to be executed is not in the cache, the method further including the step of repeatedly, until a cache miss occurs, (1) obtaining from the cache said at least two instructions together with the compounding information for the at least two instructions and (2) in response to the compounding information, executing the said at least two instructions in parallel.

5. The method of claim 4, further including, when a cache miss occurs, executing the steps of obtaining instructions, generating compounding information, and storing the sequence of instructions and the compounding information in the cache.

6. The method of claim 1, wherein the digital computer system includes means for providing a cache miss signal when an instruction to be executed is not in the cache, the step of obtaining including fetching instructions in response to the cache miss signal.

7. The method of claim 6, further including the steps of:

prefetching two or more instructions from the main memory;

in response to the prefeteched two or more instructions, generating compounding information signifying parallel execution of at least two adjacent instructions; and storing the at least two instructions and the compounding information in the cache.

8. The method of claim 1, further including the step of:

concurrently with the generating step, executing an instruction at least two instructions.

9. In a computer system including a plurality of execution units which execute instructions singly and in parallel, a method of processing instructions for parallel execution, including the steps of:

generating a sequence of instructions for execution;

prior to execution of the sequence of instructions, generating information signals indicating that at least two instructions of the sequence can be executed in parallel;

storing the sequence of instructions and the information signals in a storage device to provide fast access for execution; and executing instructions of the sequence of instructions.

10. The method of claim 9, further including:

during and after the executing step, retaining the sequence of instructions and the information signals in the storage device.

* * * * *